United States Patent
Jung et al.

(10) Patent No.: US 7,755,616 B2
(45) Date of Patent: Jul. 13, 2010

(54) LIQUID CRYSTAL DISPLAY DEVICE HAVING ELECTROMAGNETIC TYPE TOUCH PANEL

(75) Inventors: Yong Chae Jung, Kumi-shi (KR); Dong Kyu Yang, Yeosu-shi (KR)

(73) Assignee: LG Display Co., Ltd., Seoul (KR)

( * ) Notice: Subject to any disclaimer, the term of this patent is extended or adjusted under 35 U.S.C. 154(b) by 1029 days.

(21) Appl. No.: 10/681,348

(22) Filed: Oct. 9, 2003

(65) Prior Publication Data

US 2004/0189587 A1    Sep. 30, 2004

(30) Foreign Application Priority Data

Mar. 28, 2003   (KR) ............... 10-2003-0019630
Mar. 28, 2003   (KR) ............... 10-2003-0019631

(51) Int. Cl.
  *G06F 3/045*   (2006.01)
(52) U.S. Cl. ...................... 345/174; 345/173
(58) Field of Classification Search ............... 345/173, 345/174, 175, 176, 177, 178, 179, 104
See application file for complete search history.

(56) References Cited

U.S. PATENT DOCUMENTS

| | | | | |
|---|---|---|---|---|
| 5,162,782 A | * | 11/1992 | Yoshioka | 345/104 |
| 5,657,011 A | * | 8/1997 | Komatsu et al. | 341/5 |
| 5,847,690 A | * | 12/1998 | Boie et al. | 345/104 |
| 6,284,436 B1 | * | 9/2001 | Ahn et al. | 430/320 |
| 6,473,235 B2 | * | 10/2002 | Toyoshima et al. | 359/585 |
| 6,630,274 B1 | * | 10/2003 | Kiguchi et al. | 430/7 |
| 6,762,752 B2 | * | 7/2004 | Perski et al. | 345/173 |

FOREIGN PATENT DOCUMENTS

| | | |
|---|---|---|
| JP | 61-245184 | 10/1986 |
| JP | 06-337432 | 12/1994 |
| JP | 08-044494 | 2/1996 |
| JP | 9-212298 | 8/1997 |
| JP | 2000-76009 | 3/2000 |
| JP | 2003-015821 | 1/2003 |
| WO | WO 00/33244 | 6/2000 |
| WO | WO 01/29759 | 4/2001 |

* cited by examiner

*Primary Examiner*—Chanh Nguyen
*Assistant Examiner*—Calvin C Ma
(74) *Attorney, Agent, or Firm*—McKenna, Long & Aldridge LLP

(57) ABSTRACT

An LCD device having an electromagnetic (EM) type touch panel is disclosed, which includes an electromagnetic sensor inside an LCD panel. The EM type touch panel has a thin profile and can be fabricated through a simplified manufacturing process. The LCD device includes an LCD panel having first and second substrates facing each other, and a liquid crystal layer between the first and second substrates; an EM sensor having X-axis and Y-axis transparent electrode coils formed in one body with any one of the first and second substrates in the LCD panel; a backlight unit below the LCD panel; and a controller below the backlight, the controller controlling the EM sensor.

22 Claims, 15 Drawing Sheets

LIQUID CRYSTAL DISPLAY DEVICE HAVING ELECTROMAGNETIC TYPE TOUCH PANEL

This application claims the benefit of the Korean Application Nos. P2003-19630 and P2003-19631 filed on Mar. 28, 2003, which are hereby incorporated by reference for all purposes as if fully set forth therein.

BACKGROUND OF THE INVENTION

1. Field of the Invention

The present invention relates to a liquid crystal display (LCD) device, and more particularly, to an LCD device with an electromagnetic (EM) type touch panel that has a thin profile and a simplified manufacturing process.

2. Discussion of the Related Art

For personal information processors, such as personal computers and mobile transmission devices, various input devices of keyboards, mice and digitizers have been generally used for text and graphic process. As personal information devices are in demand in various fields, the input devices of the keyboards and the mice have a limit in coping with the demand as an interface. Thus, it is beneficial to develop an input device that is easier to carry and simpler than those conventional input devices. That is, a user can input information such as letters on the input device with a bare hand while carrying the input device. Modem input devices have been developed not only to satisfy general input functions, but to have new functions and to provide them with great reliability and endurance using a micro-fabrication technology.

Especially, touch panels have attracted attention as an input device for their simplicity and mobility, on which a user easily inputs letters without additional input means. Thus, the detection method, function and structure of such touch panels are well known. Capable of sensing when a user touches a display surface, touch panels are classified into resistive type, capacitive type, and electromagnetic (EM) type. For the resistive type touch panels, two resistive sheets are stacked together with spacers at a predetermined interval. The two sheets contact each other, when an input means touches the surface of the touch panels. In operation, the location of a touched point is detected by reading a current change at the touched point in an applied D.C. voltage. Meanwhile, the capacitive type touch panels read a touched point by detecting a capacitance coupling in an applied A.C. voltage. The electromagnetic EM type touch panels detect a touched point using a resonant frequency of an induced voltage in an applied electromagnetic field. Each type has different characteristics of signal amplification, resolution, and difficulty of design and fabrication, so that a type is chosen for merit, such as optical, electrical, mechanical, resistance to ambient atmosphere and input characteristics as well as endurance and economical efficiency.

In recent years, the EM type touch panels have attracted great attention, because it is possible to detect the location of a touched point with precision. Hereinafter, a structure and an operation of a general EM type touch panel will be described.

The general EM type touch panel includes a flat substrate of a digitizer having two sets of array coils (or coils), with one set being arranged in perpendicular to the other, and a stylus pen for inputting data on the flat substrate of the digitizer. The coils of the flat substrate of the digitizer are comprised of a plurality of coils piled on a flexible Printed Circuit Board PCB, and each coil is arranged at a predetermined interval from X or Y axis. Also, one end of each coil is connected to a grounding voltage, and the other end is connected to a common reference potential line to which a select signal is applied.

In this system, the stylus pen includes a resonant circuit, and the flat substrate of the digitizer operates as it receives an A.C. signal from the array coils. When the stylus pen is positioned adjacent to the flat substrate of the digitizer, the array coils to which the A.C. signal is applied generate a magnetic field. Then, the resonant circuit of the stylus pen generates a resonant frequency in response to the magnetic field. Subsequently, the resonant frequency is detected in a controller of the touch panel, and the two-dimensional location of the touched point on the flat substrate is determined through a comparison process.

In the digitizer including the plurality of coils, the coils are formed of a conductive material having light-shielding characteristics. Thus, the coils are positioned below a light source of a display device to prevent a light leakage which may be generated by the coils. Unlike the resistive or capacitive type touch panels, which require the sensor unit to be positioned above the display devices, a sensor unit of the EM type touch panel may be positioned apart from a display surface, on which a touching process is performed. This is because the EM type touch panel detects a location of a touched point using an electromagnetic wave passing through the display device and the light source.

Hereinafter, an Electro-magnetic EM type touch panel according to the related art will be described with reference to the accompanying drawings.

FIG. 1 is a schematic view illustrating an LCD device including the EM type touch panel according to the related art. As shown in FIG. 1, the LCD device including the EM type touch panel according to the related art includes an LCD panel 10, an upper polarizing plate 11, a lower polarizing plate 12, a backlight unit 13, a sensor unit 14, a control unit 15, a metal case top (not shown) and an electronic stylus pen 17. The LCD panel 10 includes upper and lower substrates bonded to each other at a fixed interval and a liquid crystal injected between the upper and lower substrates for displaying picture images according to external driving and video signals. Also, the upper polarizing plate 11 is formed on the LCD panel 10, and the lower polarizing plate 12 is formed underneath the LCD panel 10, thereby polarizing light. The backlight 13 uniformly irradiates light at the rear of the LCD panel 10. Then, the sensor unit 14 is positioned below the LCD panel 10 for transmitting and receiving a resonant frequency at a touched point of the electronic stylus pen 17, thereby detecting the location of the touched point. The control unit 15 controls the sensor unit 14. Also, the metal case top (not shown) supports the LCD panel 10, the backlight 13, the sensor unit 14 and the control unit 15 as one body, and the electronic stylus pen 17 transmits an electromagnetic wave to the sensor unit 14, and receives the electromagnetic wave from the sensor unit 14.

The sensor unit 14 includes a sensor PCB including an X-axis coil array and a Y-axis coil array, a shield plate for preventing an external electromagnetic wave at a lower portion of the sensor PCB, and a connector including a switching means for selecting specific X-axis and Y-axis coils according to a transmitting mode or a receiving mode of the sensor PCB. In the control unit 15 positioned above the sensor unit 14 for transmitting a signal to the sensor unit 14 and reading an input signal from the sensor unit 14, a Control Processor unit (CPU) is positioned for detecting the location of a touched point by the electronic stylus pen 17. Also, the electronic stylus pen 17 includes a resonant circuit having a coil and a condenser therein.

The operation of the related art EM type touch panel will be described as follows.

First, the control unit 15 is operated by receiving the signal, so that the sensor unit 14 generates the electromagnetic wave by selecting the X-axis and Y-axis coils and by inducing an electromagnetic field. Thus, the resonant circuit of the electronic stylus pen 16 generates a resonant frequency in response to the electromagnetic wave, which is held for a predetermined time period. Then, the sensor unit 14 receives the signal, and detects the location of the touched point. At this time, the electronic stylus pen 17 includes the resonant circuit, which is a RLC complex circuit. The resonant circuit causes a maximum current to flow at a predetermined frequency of an applied power source. The resonance frequency obtains output characteristics of a predetermined frequency band. The resonance frequency (f) can be expressed by the following equation, $f=1/2\pi\sqrt{LC}$ ($L$ is a coil inductance, and $C$ is a condenser capacity).

The related art EM type touch panel is different from the resistive type touch panel in that the touched point by the electronic stylus pen is detected by using the resonance of the electromagnetic field, thereby detecting the correct location of the touched point. Further, the related art EM type touch panel endures and transmits well without deterioration on a picture quality. Also, in the related art EM type touch panel, it is possible to write letters on the touch panel with the electronic stylus pen without any effect from contact by a hand, so that the related art EM type touch panel is generally used in various fields for designs, conferences and seminars.

FIG. 2 is a block diagram illustrating a driving circuit and a driving method of the related art EM type touch panel. Referring to FIG. 2, the sensor unit 14 includes X-MUX and Y-MUX coupled to the X-axis and Y-axis, respectively. A specified Y-axis coil is selected by a Y address signal (Y-ADDR), and a specified X-axis coil is selected by an X address signal (X-ADDR) for reading. Both X and Y address signals are generated from the control unit 15.

After that, output signals from the selected Y-axis coil and the X-axis coil are provided to the control unit 15. The control unit 15 includes an amplifier 24 to grade and amplify the output signals. The output of the amplifier 24 is provided to an analog-digital converter 28 through a detector 25, a low-pass filter LPF 26, and a sample and hold S/H unit 27. The analog-digital converter 28 converts the size and polarity of an analog signal to a digital format, and then inputs the converted digital format to the CPU 23. Subsequently, the output of the amplifier 24 is provided to the detector 25, and then is provided to the low-pass filter 26 and the sample and hold S/H unit 27. While the analog-digital converter 28 is digitizing the signal, the sample and hold S/H unit 27 holds a measured value of one coil, and a next coil measurement starts at the front circuit part.

The sensor unit 14 includes a plurality of coils being piled up on a flat surface of a flexible PCB. Each coil is arrayed against X-axis and Y-axis, and has one side being connected to a ground voltage, and the other side being connected to one MUX unit in which one coil is selected for being connected to an electric potential line of a fixed level.

Upon use of the electronic stylus pen 17, a sine wave current 22 generated from a sine wave generator 21 is applied to the electronic stylus pen 17 under control of the CPU 23, whereby a sine wave magnetic flux is generated around the electronic stylus pen 17. As the electronic stylus pen 17 becomes adjacent to the sensor unit 14 by a user, each sine wave voltage in different sizes is induced to each coil arrayed in the sensor unit 14 and input to the CPU 23 through the detector 25 and the analog-digital converter 28. After that, the CPU 23 calculates the value of the position of the electronic stylus pen 17 on the sensor unit 14 from the value induced to the coil, and outputs the angle value between 0° and 360°. The output data of the electronic stylus pen 17 is applied to the LCD panel 10 or stored in the CPU 23.

It is more convenient for a user to draw a figure when an area of the sensor unit 14 of the EM type touch panel is larger, and is more efficient when the resolution is higher. The resolution is in inverse proportion to spaces between coils in the sensor unit 14. That is, when the spaces between the coils are narrower, the resolution becomes higher.

In the EM type touch panel, the plurality of coils are provided inside the sensor unit 14, so that it is possible to detect the touched point of the electronic stylus pen 17 by detecting electromagnetic changes. Accordingly, unlike the resistive type touch panel, it is not required to mount the sensor unit 14 at the front of the LCD panel 10 in the EM type touch panel. That is, the digitizer may be mounted at the rear of an Liquid Crystal Module (LCM). In case of the EM type touch panel transmitting electromagnetic force and having uniform electromagnetic substance, it is possible to detect the location of the electronic stylus pen moving on the LCD panel 10 by the sensor unit 14 even if the LCD panel 10 is positioned on the sensor unit 14.

However, the related art EM type touch panel has the following disadvantages.

In the sensor unit of the related art EM type touch panel, the coils are formed of a magnetic material. Thus, in case the sensor unit is positioned on the backlight, the light from the backlight is not transmitted due to the coils, thereby decreasing transmittance. In this respect, the sensor unit is positioned below the backlight in the related art EM type touch panel. Accordingly, when assembling the sensor unit to the backlight unit of the LCD panel and the driving circuit, a metal mold of 1 mm is mounted, in addition to the LCD panel, whereby the LCD device including the EM type touch panel becomes thick and heavy.

Also, the PCB having the driving circuit of the LCD panel is positioned below the backlight, so that it is required to form the shield plate below the PCB to protect the driving circuit from the sensor unit.

SUMMARY OF THE INVENTION

Accordingly, the present invention is directed to an LCD device having an EM type touch panel that substantially obviates one or more problems due to limitations and disadvantages of the related art.

An object of the present invention is to provide an LCD device having an EM type touch panel, which includes an electromagnetic EM sensor inside an LCD panel, that has a thin profile and can be fabricated through a simplified manufacturing process.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an LCD device including an EM type touch panel may, for example, include an LCD panel having first and second substrates facing each other, and a liquid crystal layer between the first and second substrates; an EM sensor having first and second coil arrays formed of a transparent electrode, the EM sensor integrated with any one of the first and second substrates in the LCD panel; and a backlight unit below the LCD panel.

The EM sensor is formed on an outer surface of any one of the first and second substrates.

The EM sensor includes an adhesive layer on a surface opposite to the LCD panel.

The EM sensor is formed on an inner surface of any one of the first and second substrates.

At this time, the EM sensor includes a transparent substrate, wherein the first coil array is on the transparent substrate; a first transparent insulating layer on an entire surface of the transparent substrate, wherein the second coil array is on the first transparent insulating layer; and a second transparent insulating layer on the first transparent insulating layer.

Each of the first and second coil arrays include a plurality of coils, and each of the plurality of coils has first and second open ends.

The first open end is electrically connected to a grounding voltage.

The second open end is electrically connected to a MUX.

At this time, one of the plurality of coils is selected, and then a voltage from the MUX is applied to the selected coil.

The transparent electrode includes oxide indium, oxide tin, oxide zinc, indium-tin-oxide, tin-antimony-oxide or indium-zinc-oxide.

In another aspect, an LCD device including an EM type touch panel may, for example, include an LCD panel having first and second substrates facing each other, and a liquid crystal layer between the first and second substrates; a first polarizing plate on an outer surface of the first substrate; a second polarizing plate on an outer surface of the second substrate; an EM sensor having first and second coil arrays formed of a transparent electrode, the EM sensor integrated with any one of the first and second polarizing plates; and a backlight unit below the LCD panel.

The LCD device further includes film-type adhesive layers between inner surfaces of the first and second polarizing plates and outer surfaces of the first and second substrates.

The EM sensor is on an outer surface of any one of the first and second polarizing plates.

The EM sensor includes an adhesive layer on a surface opposite to the first or second polarizing plate.

The EM sensor is between the LCD panel and the first or second polarizing plate.

The EM sensor further includes an adhesive layer on a surface opposite to the LCD panel.

At this time, the EM sensor includes a transparent substrate, wherein the first coil array is on the transparent substrate; a first transparent insulating layer on an entire surface of the transparent substrate, wherein the second coil array is on the first transparent insulating layer; and a second transparent insulating layer on the first transparent insulating layer.

Each of the first and second coil arrays include a plurality of coils, and each of the plurality of coils has first and second open ends.

The first open end is electrically connected to a grounding voltage.

The second open end is electrically connected to a MUX.

Also, one of the plurality of coils is selected, and then a voltage from the MUX is applied to the selected coil.

The transparent electrode includes oxide indium, oxide tin, oxide zinc, indium-tin-oxide, tin-antimony-oxide or indium-zinc-oxide.

The transparent substrate includes any one of Polyethylene Terephtalate, Polypropylene Terephtalate, Polyethylene-2, 6-Naphtalate, Syndioctatic, Polystyrene, Norbornene-group polymer, Polycarbonate and Polyarylate.

In another aspect, an LCD device including an EM type touch panel may, for example, include first and second substrates facing each other; a thin film transistor array on the first substrate; a plurality of pixel electrode electrically connected to respective thin film transistors of the thin film transistor array; an EM sensor including first and second coil arrays formed of a transparent electrode on the second substrate; a color filter layer on the EM sensor corresponding to the pixel electrodes; an overcoat layer on the color filter layer; a common electrode on the overcoat layer; a liquid crystal layer between the first and second substrates; and a backlight unit below the first substrate.

At this time, the EM sensor includes a first transparent insulating layer over the first coil array including the second substrate, wherein the first coil is formed on the second substrate; and a second transparent insulating layer over the first transparent insulating layer, including the second coil array, wherein the second coil array is formed on the first transparent insulating layer.

The first and second transparent insulating layers are formed of organic layers.

The organic layer includes PhotoAcryl, BenzoCycloButen BCB or Polyamide compound.

Each of the first and second coil arrays include a plurality of coils, and each of the plurality of coils has first and second open ends.

The first open end is electrically connected to a grounding voltage.

The second open end is electrically connected to a MUX.

At this time, one of the plurality of coils is selected, and then a voltage from the MUX is applied to the selected coil.

The transparent electrode includes any one of oxide indium, oxide tin, oxide zinc, indium-tin-oxide, tin-antimony-oxide and indium-zinc-oxide.

The overcoat layer is formed of an organic layer.

The organic layer includes any one of PhotoAcryl, BenzoCycloButen BCB and Polyamide.

In another aspect, an LCD device including an EM type touch panel may, for example, include first and second substrates facing each other; a plurality of pixel regions on the first substrate, each pixel region including a thin film transistor, pixel electrode, and a common electrode; a color filter layer on the second substrate corresponding to the plurality of pixel regions; an EM sensor including first and second coil arrays formed of a transparent electrode on the color filter layer; an overcoat layer on the EM sensor; a liquid crystal layer between the first and second substrates; and a backlight unit below the first substrate.

At this time, the EM sensor includes a first transparent insulating layer over the color filter layer including the first coil array, wherein the first coil array is formed on the color filter; and a second transparent insulating layer over the first transparent insulating layer including the second coil array, wherein the second coil array is formed on the first transparent insulating layer.

The first and second transparent insulating layers are formed of organic layers.

The organic layer includes PhotoAcryl, BenzoCycloButen BCB or Polyamide compound.

Each of the first and second coil arrays include a plurality of coils, and each of the plurality of coils has first and second open ends.

The first open end is electrically connected to a grounding voltage.

The second open end is electrically connected to a MUX.

At this time, one of the plurality of coils is selected, and then a voltage from the MUX is applied to the selected coil.

The transparent electrode includes any one of oxide indium, oxide tin, oxide zinc, indium-tin-oxide, tin-antimony-oxide and indium-zinc-oxide.

In another aspect, an LCD device including an EM type touch panel may, for example, include first and second substrates facing each other; a thin film transistor array on the first substrate; a plurality of pixel electrode electrically connected to respective thin film transistors of the thin film transistor array; an insulating layer on the first substrate; an EM sensor including first and second coil arrays formed of a transparent electrode on the insulating layer; a color filter layer on the second substrates; a liquid crystal layer between the first and second substrates; and a backlight unit below the first substrate.

The insulating layer is formed of an organic layer.

The organic layer includes any one of PhotoAcryl, Benzo-CycloButen BCB or Polyamide.

At this time, the EM sensor includes a first transparent insulating layer over the insulating layer including the first coil array, wherein the first coil array is formed on the insulating layer; and a second transparent insulating layer over the first transparent insulating layer including the second coil array, wherein the second coil array is formed on the first transparent insulating layer.

Each of the first and second coil arrays include a plurality of coils, and each of the plurality of coils has first and second open ends.

The first open end is electrically connected to a grounding voltage.

The second open end is electrically connected to a MUX.

At this time, one of the coils is selected, and then a voltage from the MUX is applied to the selected coil.

The transparent electrode includes any one of oxide indium, oxide tin, oxide zinc, indium-tin-oxide, tin-antimony-oxide and indium-zinc-oxide.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, an LCD device including an EM type touch panel according to the present invention will be described with reference to the accompanying drawings.

Figure 1:
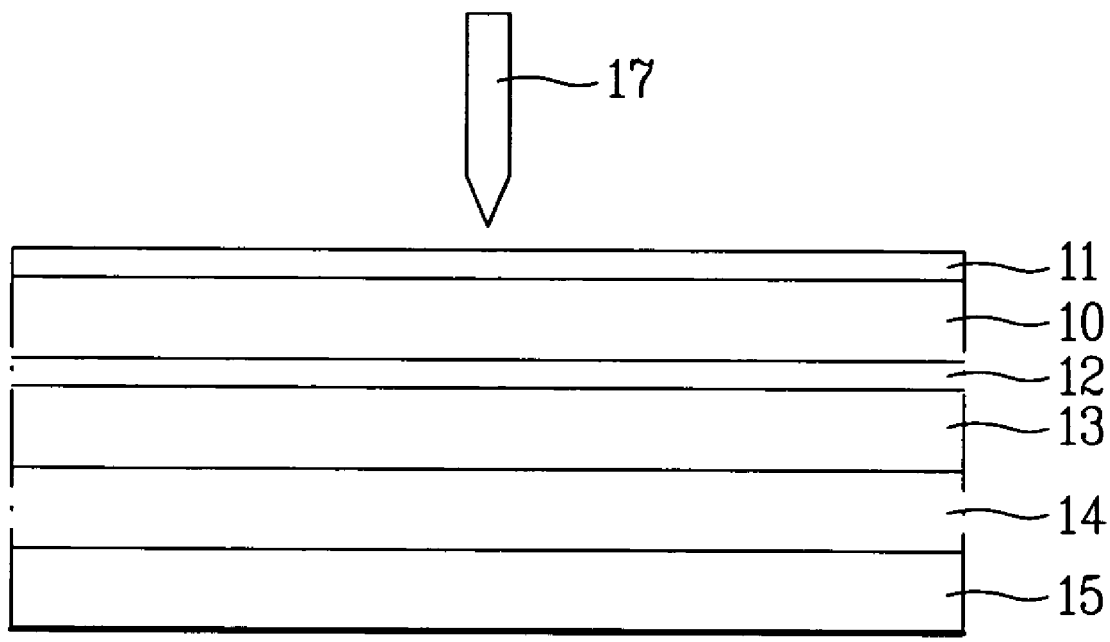
FIG. 1 is a cross-sectional view schematically illustrating an LCD device including an EM type touch panel according to the related art.
Figure 2:
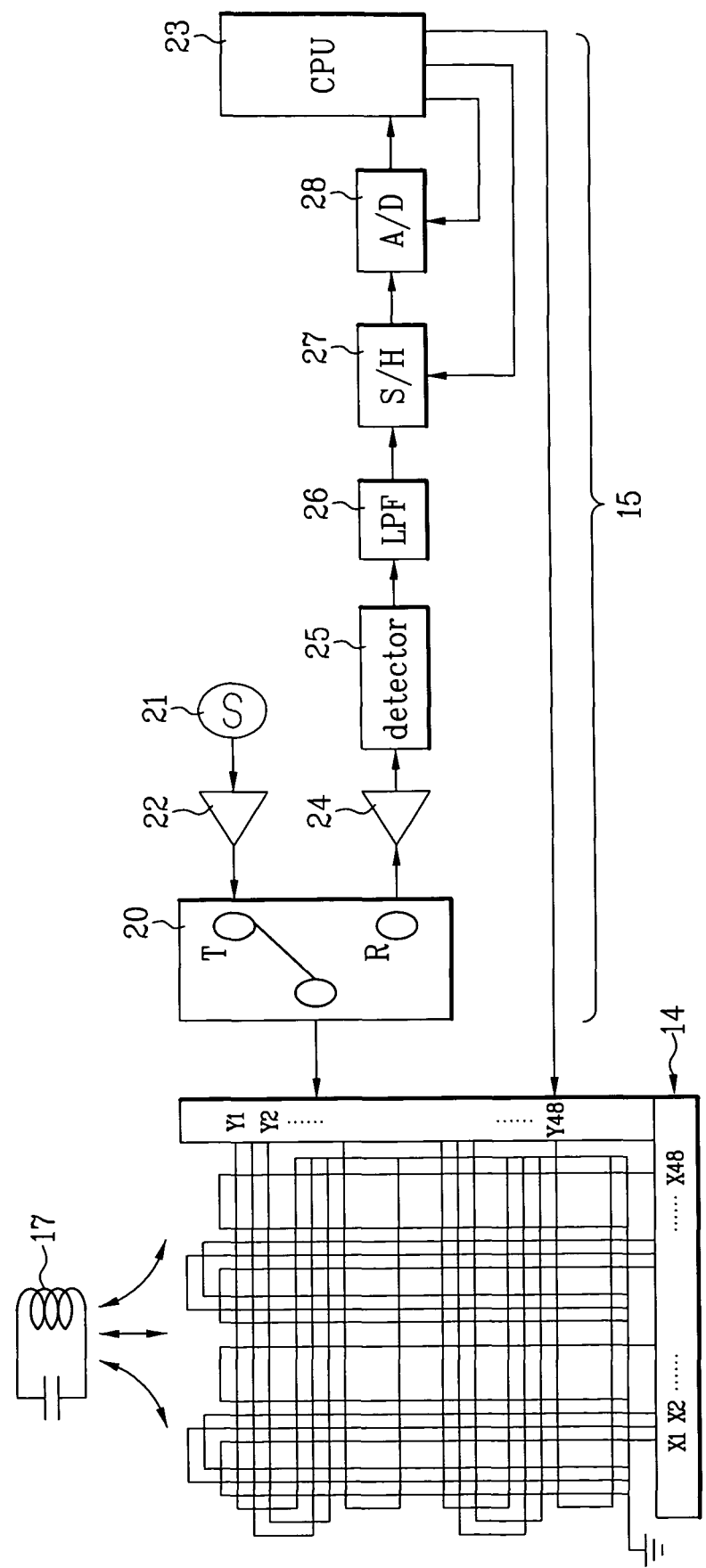
FIG. 2 is a block diagram illustrating a driving circuit and a driving method of an EM type touch panel according to the related art.
Figure 3:
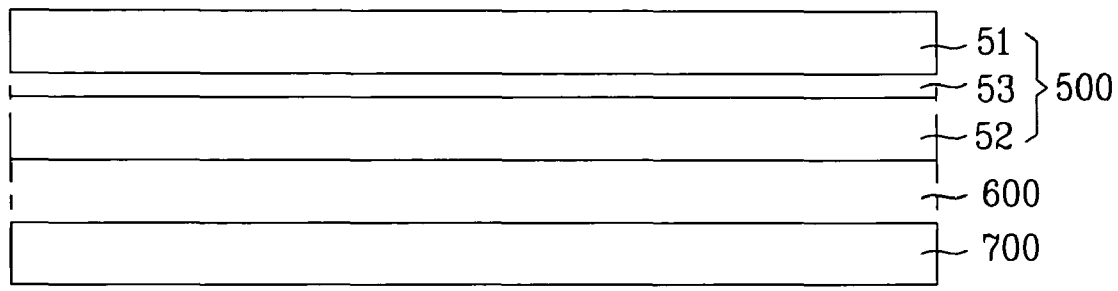
FIG. 3 is a cross-sectional view schematically illustrating an LCD device including an EM type touch panel according to the present invention.

FIG. 3 is a cross-sectional view schematically illustrating an LCD device including an EM type touch panel according to the present invention. As shown in FIG. 3, the LCD device includes an LCD panel 500 having upper and lower substrates 51 and 52 facing each other and a liquid crystal layer 53 between the upper and lower substrates 51 and 52, a backlight unit 600 below the LCD panel 500 for producing light, and a controller under the backlight unit 600 for controlling an electromagnetic EM sensor. At this time, the EM sensor is formed on any one of the upper and lower substrates 51 and 52 of the LCD panel 500 as one body thereof.

Figure 4A:
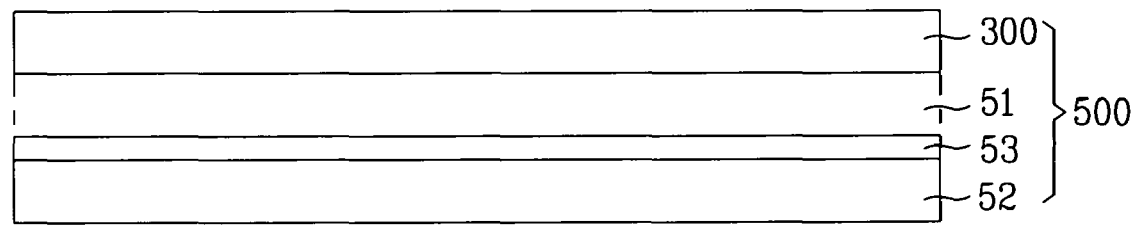
FIG. 4A is a cross-sectional view illustrating an LCD device having an EM sensor on outer surface of an upper substrate of an LCD panel.
Figure 4B:
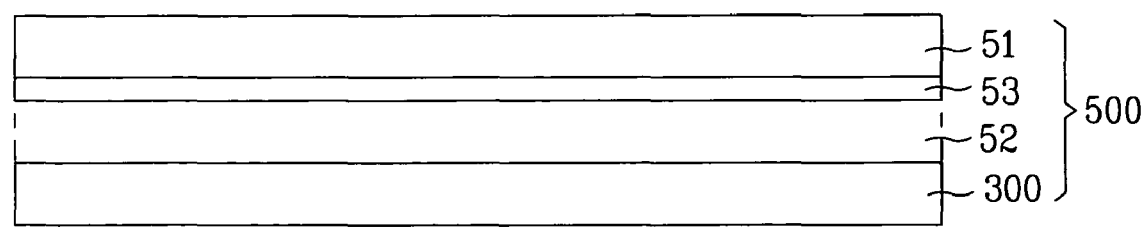
FIG. 4B is a cross-sectional view illustrating an LCD device having an EM sensor on an outer surface of a lower substrate of an LCD panel.

FIG. 4A is a cross-sectional view illustrating an LCD device having an EM sensor on an outer surface of an upper substrate of an LCD panel. FIG. 4B is a cross-sectional view illustrating an LCD device having an EM sensor on an outer surface of a lower substrate of an LCD panel. Referring to FIG. 4A and FIG. 4B, the EM sensor 300 may be formed on an outer surface of any one of the upper and lower substrates 51 and 52 in the LCD panel 500.

Figure 5A:
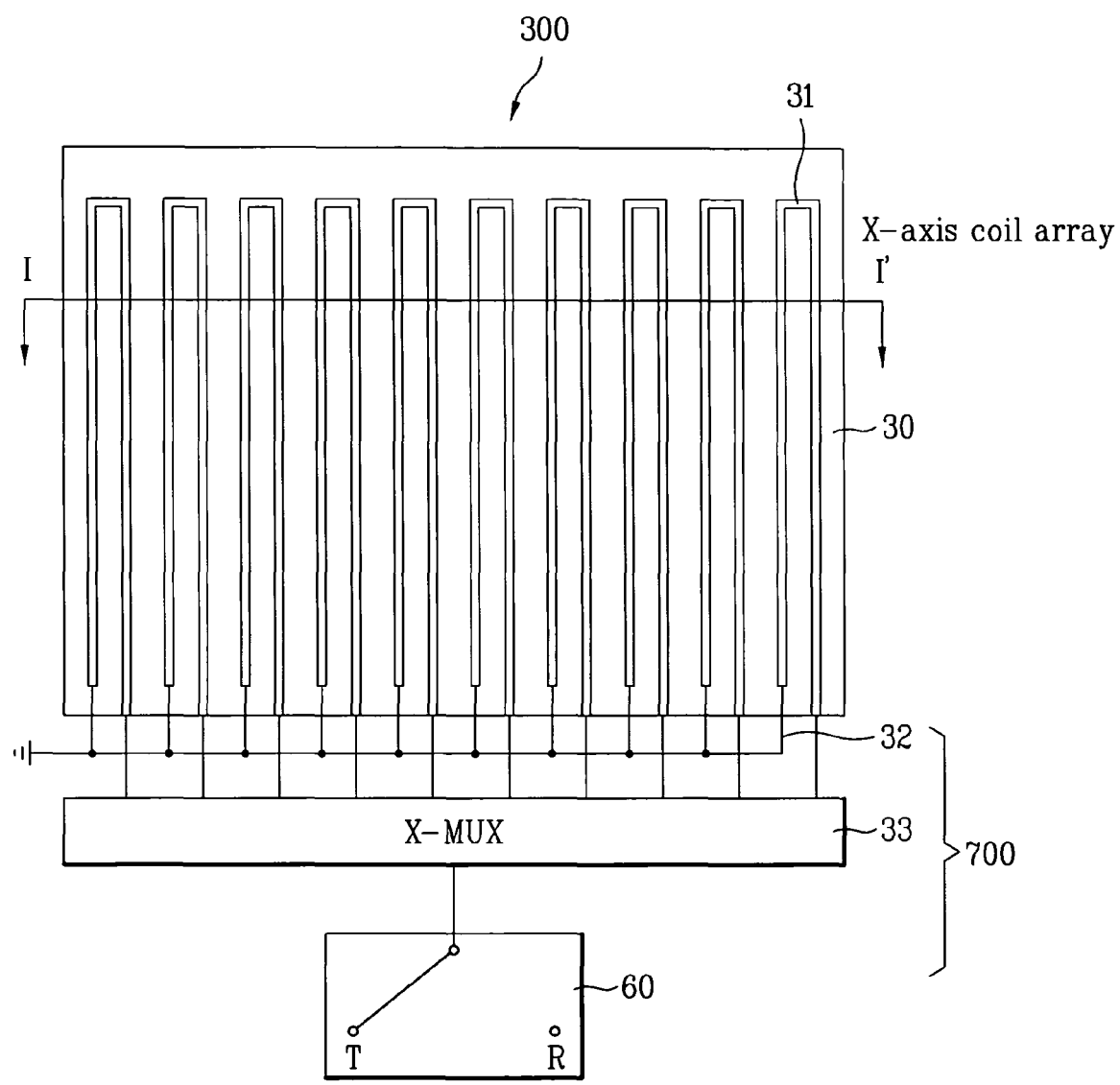
FIG. 5A is a plan view illustrating an X-axis coil array of an EM sensor of FIG. 4A and FIG. 4B.
Figure 5B:
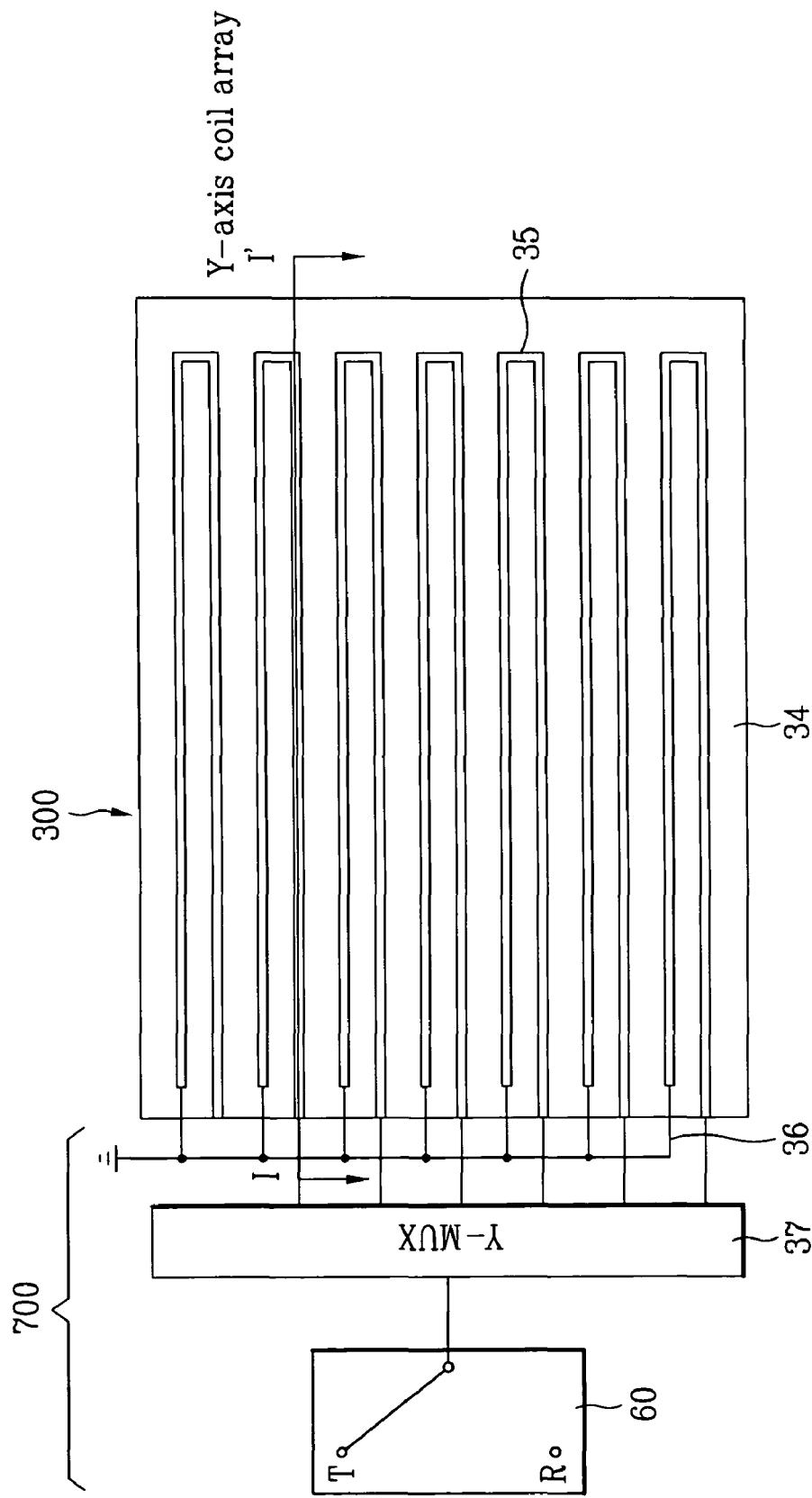
FIG. 5B is a plan view illustrating a Y-axis coil array of an EM sensor of FIG. 4A and FIG. 4B.

FIG. 5A is a plan view illustrating an X-axis coil array of an EM sensor of FIG. 4A and FIG. 4B. FIG. 5B is a plan view illustrating a Y-axis coil array of an EM sensor of FIG. 4A and FIG. 4B.

As shown in FIG. 5A, in the EM sensor on the outer surface of any one of the upper substrate (reference numeral 51 of FIG. 4A and FIG. 4B) and the lower substrate (reference numeral 52 of FIG. 4A and FIG. 4B) of the LCD panel (reference numeral 500 of FIG. 4A and FIG. 4B), an X-axis coil array is formed on a transparent substrate 30 at fixed intervals, and includes a plurality of X-axis coils 31. At this time, the transparent substrate 30 is formed of Polyethylene Terephtalate, Polypropylene Terephtalate, Polyethylene-2, 6-Naphtalate, Syndioctatic, Polystyrene, Norbornene-group polymer, Polycarbonate or Polyarylate. Each X-axis coil has a '∩' shape with two open ends. One end of each X-axis coil 31 is connected to an external grounding voltage Vss through a grounding voltage applying line 32, and the other end thereof is connected to a X-MUX 33. Upon a touching by an electronic stylus pen, a specific X-axis coil 31, which is most adjacent to the touched point, is selected, so that a voltage of a predetermined level is applied thereto. The X-MUX 33 is connected to a transmitting-receiving converter 60, for transmitting a detection signal on a Transmitting T mode to a CPU, and for detecting a location of the electronic stylus pen on a Receiving R mode.

Referring to FIG. 5B, a Y-axis coil array is formed on a first transparent insulating layer 34 in perpendicular to the X-axis coil array, and includes a plurality of Y-axis coils 35. Each Y-axis coil 35 has a '⊃' shape with two open ends. One end of each Y-axis coil 35 is connected to an external grounding voltage Vss through a grounding voltage applying line 36, and the other end thereof is connected to a Y-MUX 37. Upon a touching by an electronic stylus pen, a specific Y-axis coil, which is most adjacent to the touched point, is selected, so that a voltage of a predetermined level is applied thereto. Like the X-axis coil array, the Y-MUX 37 is connected to the transmitting-receiving converter 60, for transmitting a detection signal on a Transmitting T mode to the CPU, and for detecting a location of the electronic stylus pen on a Receiving R mode. When the transmitting-receiving converter 60 selects a predetermined mode (a Transmitting T mode or a Receiving R mode), the X-axis coil 31 and the Y-axis coil 35 are driven at the predetermined mode.

At this time, the X-axis coil 31 and the Y-axis coil 35 are formed of transparent electrodes. Thus, even if the EM sensor having the coils is formed on the LCD panel, it is possible to prevent light transmittance from being low. The transparent electrodes of the X-axis and Y-axis coil 31 and 35 are formed of, for example, oxide indium, oxide tin, oxide zinc, indium-tin-oxide, tin-antimony-oxide or indium-zinc-oxide. Herein, the transmitting-receiving converter 60, the X-MUX 33, the Y-MUX 37, some portions of the grounding voltage applying lines 32 and 36 and a grounding voltage source are provided in the controller 700 positioned below the LCD panel 500 and the backlight unit 600, for providing the voltage to the X-axis and Y-axis coils 31 and 35, and controlling the same.

Figure 6:
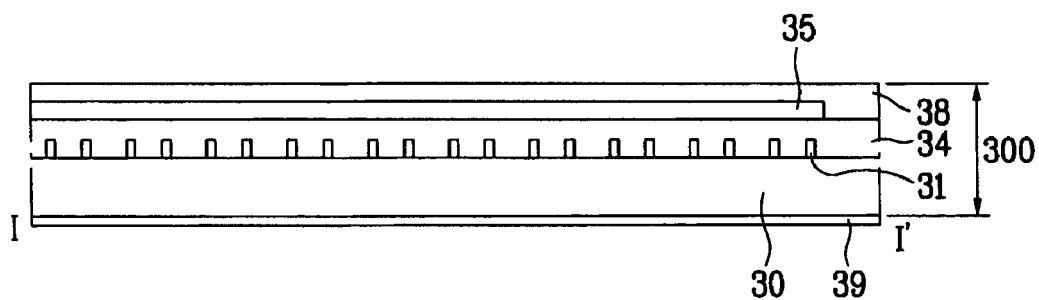
FIG. 6 is a cross-sectional view taken along line I-I' of FIG. 5A and FIG. 5B.

FIG. 6 is a cross-sectional view taken along line I-I' of FIG. 5A and FIG. 5B. As shown in FIG. 6, the EM sensor 300 is formed on the outer surface of the upper or lower substrate 51 or 52 of the LCD panel 500. At this time, an adhesive layer 39 is formed facing the outer surface of the upper or lower substrate 51 or 52 of the LCD panel 500. Next, the EM sensor 300 includes the X-axis coil 31 of the transparent electrode substance formed on the transparent substrate 30 at the fixed intervals, the first transparent insulating layer 34 on an entire surface of the transparent substrate 30 including the X-axis coil 31 for flattening, the Y-axis coil 35 on the first transparent insulating layer 34 in perpendicular to the X-axis coil 31, and a second transparent insulating layer 38 on an entire surface of the first transparent insulating layer 34 for flattening. At this time, the first and second transparent insulating layer 34 and 38 are formed of an inorganic insulating layer such as SiOx or SiNx, or an organic insulating layer such as Photo-Acryl, BenzoCycloButen BCB or Polyamide compound.

Figure 7:
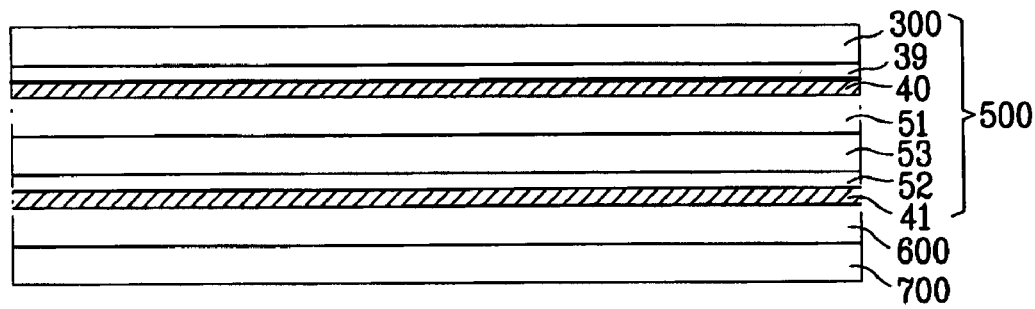
FIG. 7 is a cross-sectional view illustrating an LCD device including an EM type touch panel according to the first embodiment of the present invention.

FIG. 7 is a cross-sectional view illustrating an LCD device including an EM type touch panel according to the first embodiment of the present invention, in which an EM sensor 300 is formed in one body with a first polarizing plate 40 by interposing an adhesive layer 39 on an outer surface of the first polarizing plate 40. Referring to FIG. 7, the LCD device including the EM type touch panel according to the first embodiment of the present invention includes the EM sensor 300, the adhesive layer 39, the first polarizing plate 40, an upper substrate 51, a liquid crystal layer 53, a lower substrate 52, a second polarizing plate 41, a backlight unit 600 and a controller 700. At this time, an LCD panel 500 includes the EM sensor 300, the adhesive layer 39, the first polarizing plate 40, the upper substrate 51, the liquid crystal layer 53, the lower substrate 52 and the second polarizing plate 41 except the backlight unit 600 and the controller 700.

In this state, adhesive layers (not shown) of film types are formed on inner surfaces of the first and second polarizing plates 40 and 41, with the adhesive layers facing the upper and lower substrates 51 and 52 of the LCD panel 500, whereby the adhesive layers of the first and second polarizing plates 40 and 41 are attached to the upper and lower substrates 51 and 52, respectively. Herein, the adhesive layers are not formed on outer surfaces of the first and second polarizing plates 40 and 41, so that it is required to form the adhesive layer 39 on any outer surface of the first polarizing plate 40 to attach the EM sensor 300 thereto.

Referring to FIG. 6, the EM sensor 300 includes X-axis and Y-axis transparent electrode coils 31 and 35 on a transparent substrate 30. At this time, the EM sensor 300 is formed in one body with the backlight unit 600 and the first polarizing plate 40 of the LCD panel 500. That is, the EM sensor 300 is formed during a liquid crystal module (LCM) process. Accordingly, when forming the EM sensor 300 during the LCM process, a gap for the EM sensor 300 is not required in an assembling process of components such as the backlight unit 600 and the controller 700, thereby improving integration, compared with a case where the EM sensor 300 is provided under the backlight unit 600. At this time, the controller 700 is positioned under the backlight unit 600 for driving and controlling the EM sensor 300. Thus, it is possible to form the EM sensor 300 during the formation of the LCD panel 500. Also, the process for assembling the backlight unit 600 and the EM sensor 300 is not required. Thus, it is not required to form an additional shield plate below a PCB to protect the LCD panel from the electromagnetic field of the EM sensor 300.

Figure 8:
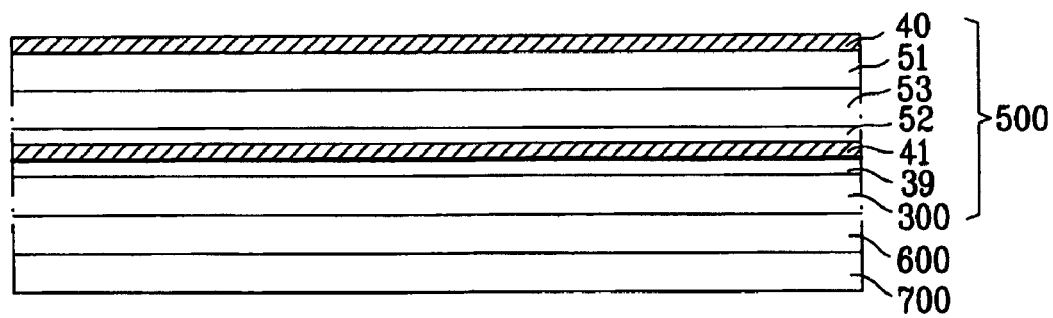
FIG. 8 is a cross-sectional view illustrating an LCD device including an EM type touch panel according to the second embodiment of the present invention.

FIG. 8 is a cross-sectional view illustrating an LCD device including an EM type touch panel according to the second embodiment of the present invention. As shown in FIG. 8, in the LCD device including the EM type touch panel according to the second embodiment of the present invention, an adhesive layer 39 is formed on an outer surface of a second polarizing plate 41, whereby an EM sensor 300 is formed in one body with a second polarizing plate 40. At this time, the LCD device having the EM type touch panel according to the second embodiment of the present invention includes the first polarizing plate 40, an upper substrate 51, a liquid crystal layer 53, a lower substrate 52, the second polarizing plate 41, the adhesive layer 39, the EM sensor 300, a backlight unit 600 and a controller 700.

The LCD device having the EM type touch panel according to the second embodiment of the present invention has the same structure as the LCD device having the EM type touch panel according to the first embodiment of the present invention except that the EM sensor 300 is positioned on an outer surface of the second polarizing plate 41, whereby the same reference numerals are used throughout the drawings to refer to the same or like parts.

Like the first embodiment of the present invention, in the LCD device having the EM type touch panel according to the second embodiment of the present invention, an LCD panel 500 includes the first polarizing plate 40, the upper substrate 51, the liquid crystal layer 53, the lower substrate 52, the second polarizing plate 41, the adhesive layer 39 and the EM sensor 300 except the backlight unit 600 and the controller 700.

Hereinafter, LCD devices having EM type touch panels according to the third and fourth embodiments of the present invention have structures in which an EM sensor 300 is provided on an inner surface of a first polarizing plate 40 or a second polarizing plate 41, or is provided on an outer surface of an upper substrate 51 or a lower substrate 52.

Figure 9:
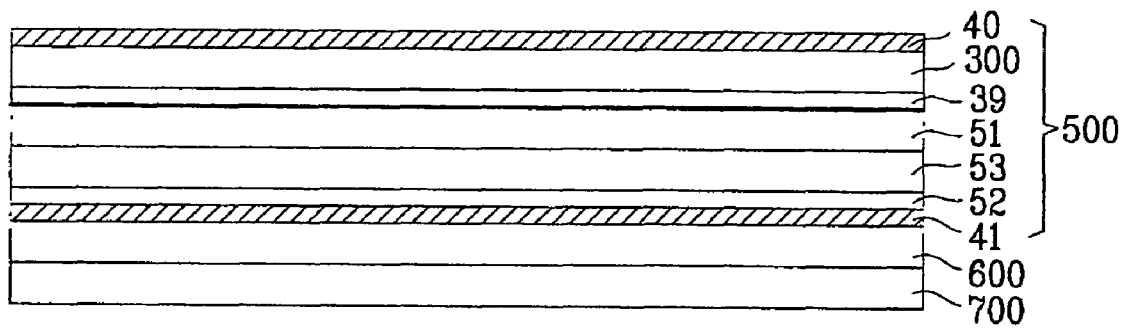
FIG. 9 is a cross-sectional view illustrating an LCD device including an EM type touch panel according to the third embodiment of the present invention.

FIG. 9 is a cross-sectional view illustrating an LCD device including the EM type touch panel according to the third embodiment of the present invention. Referring to FIG. 9, in the LCD device including the EM type touch panel according to the third embodiment of the present invention, an adhesive layer 39 is additionally formed on an outer surface of an upper substrate 51, so that an EM sensor 300 is formed in one body with a first polarizing plate 40. At this time, the EM sensor 300 is formed between the first polarizing plate 40 and the upper substrate 51. Also, an adhesive layer (not shown) is formed on an inner surface of the first polarizing plate 40, facing the upper substrate 51, and the adhesive layer 39 is formed in a contact surface between the EM sensor 300 and the upper substrate 51, whereby the EM sensor 300 is formed in one body with an LCD panel 500. From the top, the LCD device including the EM type touch panel according to the third embodiment of the present invention sequentially includes the first polarizing plate 40, the EM sensor 300, the adhesive layer 39, the upper substrate 51, a liquid crystal layer 53, a lower substrate 52, a backlight unit 600 and a controller 700.

The LCD device including the EM type touch panel according to the third embodiment of the present invention has the same structure as the LCD device including the EM type touch panel according to the first embodiment of the present invention except that the EM sensor 300 is formed on the inner surface of the first polarizing plate 40, whereby the same reference numerals are used throughout the drawings to refer to the same or like parts. Also, like the LCD device including the EM type touch panel according to the first embodiment of the present invention, in the LCD device including the EM type touch panel according to the third embodiment of the present invention, the LCD panel 500 is comprised of the first polarizing plate 40, the EM sensor 300, the adhesive layer 39, the upper substrate 51, the liquid crystal layer 53, the lower substrate 52 and the second polarizing plate 41 except the backlight unit 600 and the controller 700.

Figure 10:
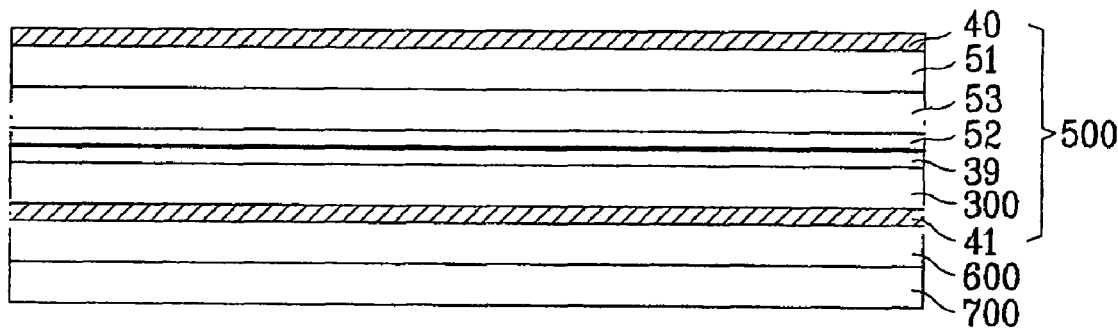
FIG. 10 is a cross-sectional view illustrating an LCD device including an EM type touch panel according to the fourth embodiment of the present invention.

FIG. 10 is a cross-sectional view illustrating an LCD device including an EM type touch panel according to the fourth embodiment of the present invention. As shown in FIG. 10, in the LCD device including the EM type touch panel according to the fourth embodiment of the present invention, an adhesive layer 39 is additionally formed on an outer surface of a lower substrate 52, whereby an EM sensor 300 is formed in one body with a second polarizing plate 41.

At this time, the EM sensor 300 is formed between the second polarizing plate 41 and the lower substrate 52. Also, an adhesive layer (not shown) is formed on an inner surface of the second polarizing plate 41, facing the lower substrate 52, and the adhesive layer 39 is formed in a contact surface between the EM sensor 300 and the lower substrate 52, whereby the EM sensor 300 is formed in one body with an LCD panel 500. From the top, the LCD device including the EM type touch panel according to the fourth embodiment of the present invention sequentially includes a first polarizing plate 40, an upper substrate 51, a liquid crystal layer 53, the lower substrate 52, the adhesive layer 39, the EM sensor 300, the second polarizing plate 41, a backlight unit 600 and a controller 700.

The LCD device including the EM type touch panel according to the fourth embodiment of the present invention has the same structure as the LCD device including the EM type touch panel according to the first embodiment of the present invention except that the EM sensor 300 is formed on the inner surface of the second polarizing plate 41, whereby the same reference numerals are used throughout the drawings to refer to the same or like parts. Also, like the LCD device including the EM type touch panel according to the first embodiment of the present invention, in the LCD device including the EM type touch panel according to the fourth embodiment of the present invention, the LCD panel 500 is comprised of the first polarizing plate 40, the EM sensor 300, the adhesive layer 39, the upper substrate 51, the liquid crystal layer 53, the lower substrate 52 and the second polarizing plate 41 except the backlight unit 600 and the controller 700.

In the LCD devices including the EM type touch panels according to the first to fourth embodiments of the present invention, the EM sensor 300 is formed on the outer or inner surface of the first polarizing plate 40 or the second polarizing plate 41. At this point, it should be understood that an EM type touch panel formed according to one of the principles of the present invention can be integrated with either polarizing plates, substrates or components of an LCD device, so long as the EM type touch panel is provided over a back light unit of the LCD device.

Hereinafter, an LCD device including an EM type touch panel according to the present invention, in which an EM sensor 300 is formed on an inner surface of an upper substrate 51 or a lower substrate 52 in an LCD panel 500.

Figure 11A:
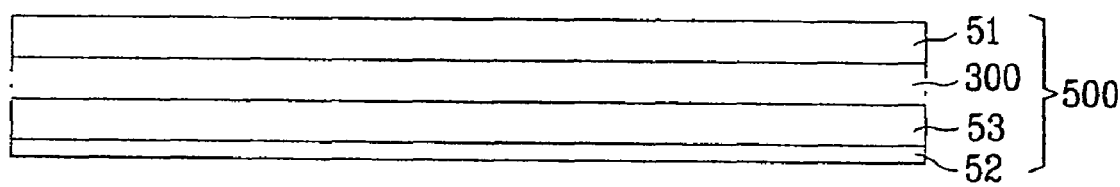
FIG. 11A is a cross-sectional view illustrating an LCD device having an EM sensor on an inner surface of an upper substrate of an LCD panel.
Figure 11B:
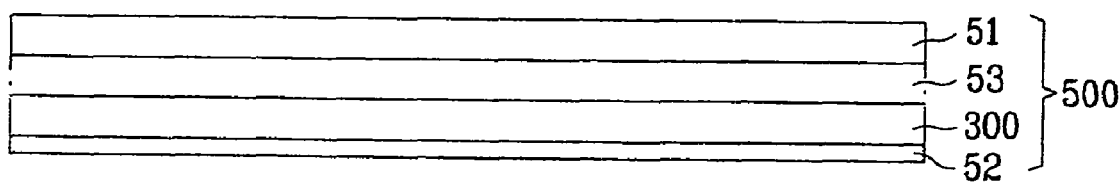
FIG. 11B is a cross-sectional view illustrating an LCD device having an EM sensor on an inner surface of a lower substrate of an LCD panel.

FIG. 11A is a cross-sectional view illustrating an LCD device having an EM sensor on an inner surface of an upper substrate of an LCD panel. FIG. 11B is a cross-sectional view illustrating an LCD device having an EM sensor on an inner surface of a lower substrate of an LCD panel. As shown in FIG. 11A and FIG. 11B, an EM sensor 300 may be formed on an inner surface of an upper substrate 51 or a lower substrate 52 in an LCD panel 500.

Figure 12A:
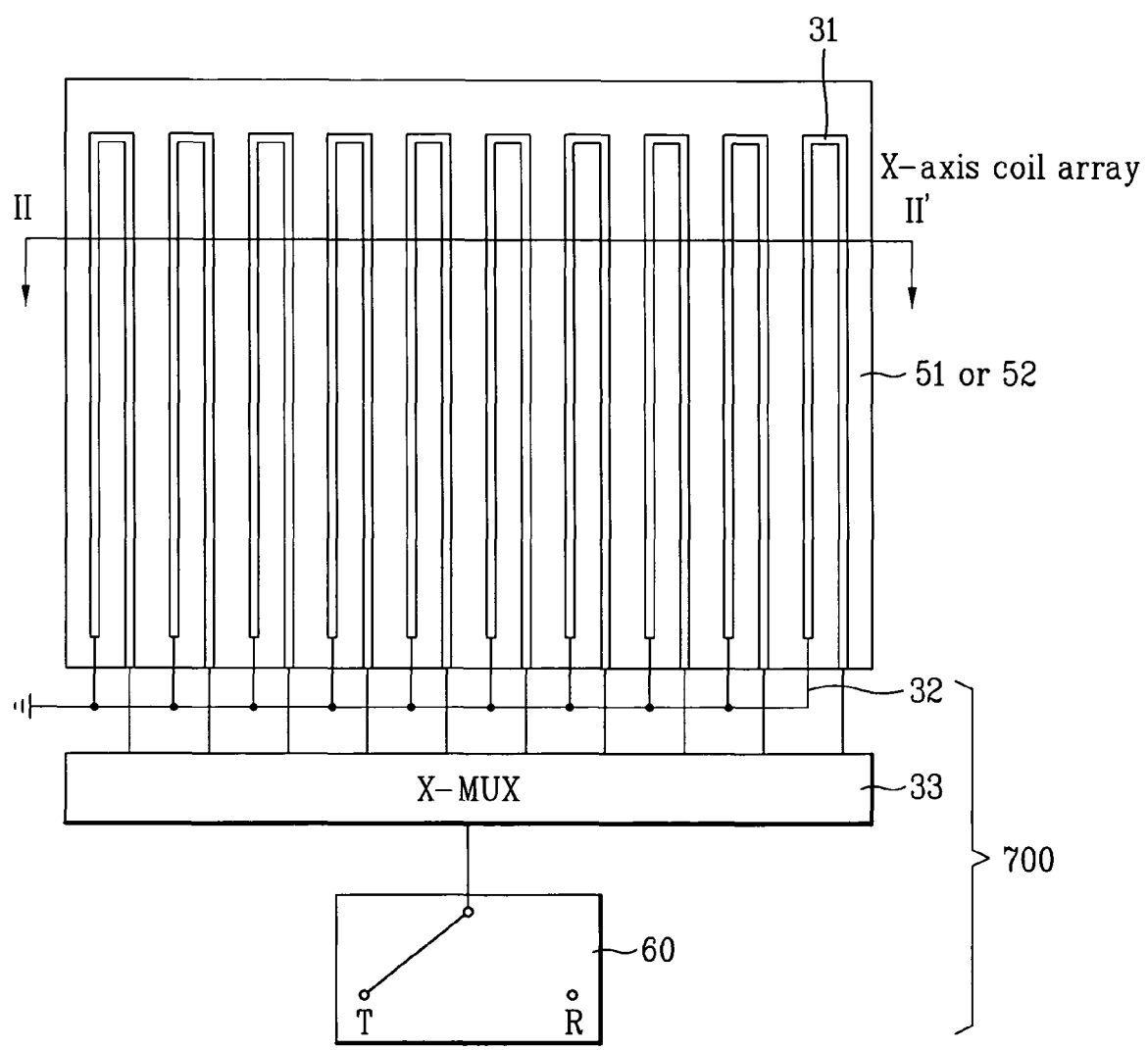
FIG. 12A is a plan view illustrating an X-axis coil array of an EM sensor of FIG. 11A and FIG. 11B.
Figure 12B:
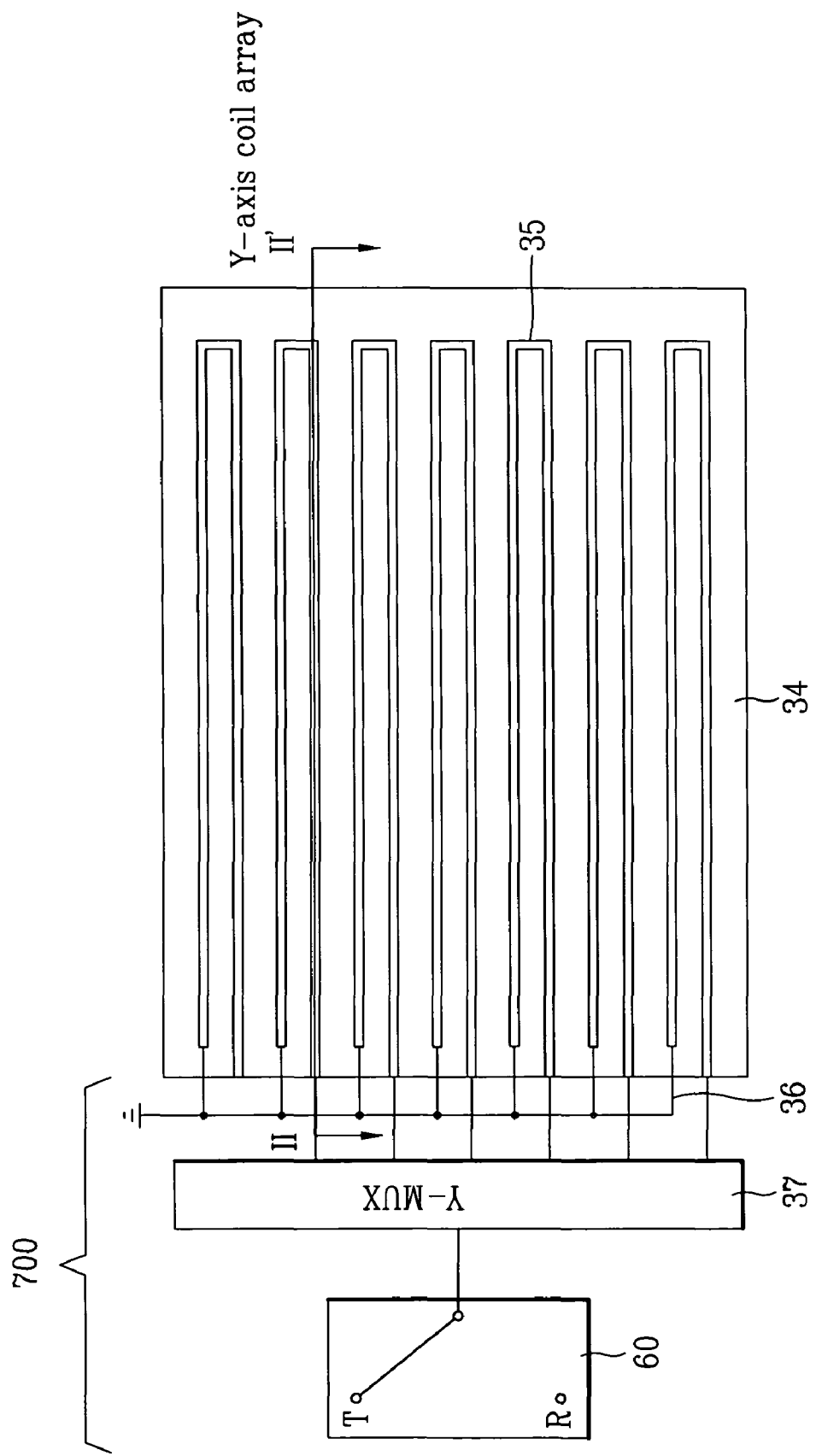
FIG. 12B is a plan view illustrating a Y-axis coil array of an EM sensor of FIG. 11A and FIG. 11B.
Figure 13:
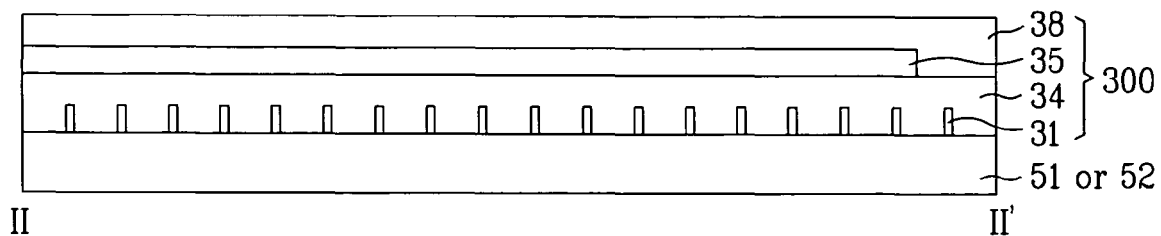
FIG. 13 is a cross-sectional view taken along line II-II' of FIG. 12A and FIG. 12B.

FIG. 12A is a plan view illustrating an X-axis coil array of an EM sensor of FIG. 11A and FIG. 11B. FIG. 12B is a plan view illustrating a Y-axis coil array of an EM sensor of FIG. 11A and FIG. 11B. FIG. 13 is a cross-sectional view taken along line II-II' of FIG. 12A and FIG. 12B.

As shown in FIG. 12A, an X-axis coil array of an EM sensor 300 is formed on any one of upper and lower substrates 51 and 52 in an LCD panel 500 at fixed intervals, and includes a plurality of X-axis coils 31. Each X-axis coil has a '∩' shape with two open ends. One end of each X-axis coil 31 is connected to an external grounding voltage Vss through a grounding voltage applying line 32, and the other end thereof is connected to a X-MUX 33. Upon a touching by an electronic stylus pen, a specific X-axis coil 31, which is most adjacent to a touched point, is selected, so that a voltage of a predetermined level is applied thereto. The X-MUX 33 is connected to a transmitting-receiving converter 60, for transmitting a detection signal on a Transmitting T mode to a CPU, and for detecting a location of the electronic stylus pen on a Receiving R mode.

Referring to FIG. 12B, a Y-axis coil array is formed on a first transparent insulating layer 34 in perpendicular to the X-axis coil array, and includes a plurality of Y-axis coils 35. Each Y-axis coil 35 has a '∩' shape with two open ends. Like the X-axis coils 31, one end of each Y-axis coil 35 is connected to an external grounding voltage Vss through a grounding voltage applying line 36, and the other end thereof is connected to a Y-MUX 37. Upon a touching by the electronic stylus pen, a specific Y-axis coil, which is most adjacent to a touched point, is selected, so that a voltage of a predetermined level is applied thereto. Like the X-axis coil array, the Y-MUX 37 is connected to the transmitting-receiving converter 60, for transmitting a detection signal on a Transmitting T mode to the CPU, and for detecting a location of the electronic stylus pen on a Receiving R mode. When the transmitting-receiving converter 60 selects predetermined mode (a Transmitting T mode or a Receiving R mode), the X-axis coils 31 and the Y-axis coils 35 are driven at the predetermined mode.

At this time, the X-axis coils 31 and the Y-axis coils 35 are formed of transparent electrodes. Thus, even if the EM sensor having the coils is formed on the LCD panel, it is possible to prevent light transmittance from being low. Also, the grounding voltage applying lines 32 and 36 are connected to the X-MUX 33 and the Y-MUX 37, respectively. The grounding voltage applying lines 32 and 36 are formed of a conductive material such as Ag or Cu on a non-viewing area (dead space region), thereby preventing light transmittance from being low. The transparent electrodes of the X-axis and Y-axis coils 31 and 35 are formed of, for example, oxide indium, oxide tin, oxide zinc, indium-tin-oxide, tin-antimony-oxide or indium-zinc-oxide. Herein, the transmitting-receiving converter 60, the X-MUX 33, the Y-MUX 37, some portions of the grounding voltage applying lines 32 and 36 and a grounding voltage source are provided in the controller 700 positioned below the LCD panel 500 and the backlight unit 600, for providing the voltage to the X-axis and Y-axis coils 31 and 35, and controlling the same.

Unlike the first to fourth embodiments of the present invention, referring to FIG. 13, in case the EM sensor 300 is formed on the inner surface of the upper substrate 51 or the lower substrate 52 during a deposition process of an array process for the upper substrate 51 or the lower substrate 52, it is not required to form an additional adhesive layer.

Then, the EM sensor 300 includes the X-axis coils 31 of the transparent electrode substance formed on the upper substrate 51 or the lower substrate 52 at the fixed intervals, the first transparent insulating layer 34 on an entire surface of the transparent substrate 30 including the X-axis coils 31 for flattening, the Y-axis coils 35 on the first transparent insulating layer 34 in perpendicular to the X-axis coils 31, and a second transparent insulating layer 38 on an entire surface of the first transparent insulating layer 34 for flattening. At this time, the first and second transparent insulating layer 34 and 38 are formed of an inorganic insulating layer such as $SiO_x$ or $SiN_x$, or an organic insulating layer such as PhotoAcryl, BenzoCycloButen BCB or Polyamide compound. In case the EM sensor 300 is formed on the inner surface of the upper substrate 51 or the lower substrate 52 in the LCD panel 500, a position of the EM sensor 300 varies according to a driving method.

Hereinafter, a TN mode LCD device will be described as follows.

Figure 14:
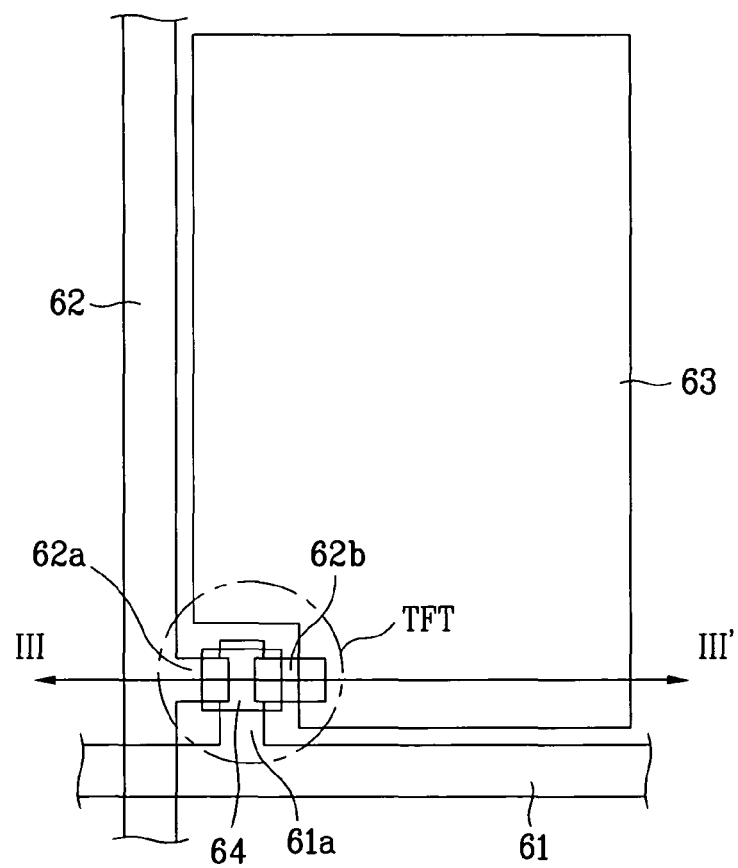
FIG. 14 is a plan view illustrating a lower substrate of an LCD device including an EM type touch panel according to the fifth embodiment of the present invention.
Figure 15:
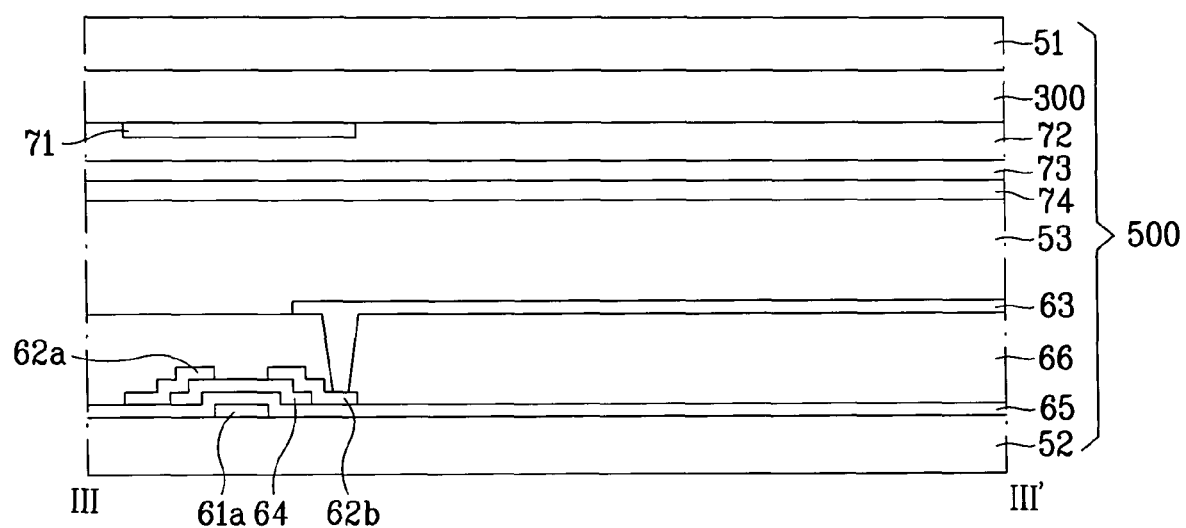
FIG. 15 is a cross-sectional view taken along line III-III' of FIG. 14.

FIG. 14 is a plan view illustrating a lower substrate of an LCD device including an EM type touch panel according to the fifth embodiment of the present invention. FIG. 15 is a cross-sectional view taken along line III-III' of FIG. 14.

As shown in FIG. 14, in the LCD device including the EM type touch panel according to the fifth embodiment of the present invention, which is driven in a TN mode, a gate line 61 having a gate electrode 61 projected therefrom is formed on a lower substrate (reference numeral 52 of FIG. 15). Also, a data line 62 having source/drain electrodes 62a and 62b is formed in perpendicular to the gate line, so that a pixel region is defined by the gate and data lines 61 and 62 crossing each other, and a pixel electrode 63 is formed in the pixel region. At this time, a semiconductor layer 64, in which a channel region is defined, is formed above the gate electrode 61a, and source/drain electrodes 62a and 62b are connected to both sides of the channel region of the semiconductor layer 64. Referring to FIG. 14, a thin film transistor TFT of an array form is formed in each pixel region, and the pixel electrode 63 is formed in the drain electrode 62b of the thin film transistor TFT and each pixel region 63.

As shown in FIG. 15, a gate insulating layer 65 is formed on an entire surface of the lower substrate 52 including the gate electrode 61a and the gate line 61, and the gate electrode 61a is insulated from the semiconductor layer 64. Also, a passivation layer 66 is formed on the entire surface of the lower substrate 52 including the source/drain electrodes 62a and 62b and the data line 62. Herein, the passivation layer 66 has a contact hole for exposing a predetermined portion of the drain electrode 62b, whereby the pixel electrode 63 is electrically connected to the drain electrode 62b. At this time, the gate insulating layer 65 and the passivation layer 66 are formed of SiOx or SiNx.

Still referring to FIG. 15, an EM sensor including an X-axis transparent electrode coil array and a Y-axis transparent electrode coil array is formed on an upper substrate 51, and then a light-shielding layer 71 is formed above the EM sensor 300 for shielding portions except the pixel region from light. Then, a color filter layer 72 is formed corresponding to at least the pixel electrode 63, and an overcoat layer 73 is formed on an entire surface of the upper substrate 51 including the color filter layer 72 for flattening the surface of the upper substrate 51. Subsequently, a common electrode 74 is formed on an entire surface of the overcoat layer 73. At this time, the overcoat layer 73 is formed of an organic insulating layer having low dielectric constant, such as PhotoAcryl, Benzo- CycloButen BCB or Polyamide compound, for preventing electric interference from the EM sensor 300.

In the TN mode, a liquid crystal layer 63 is driven with a vertical type electric field between the pixel electrode 63 of the lower substrate 52 and the common electrode 74 of the upper substrate 51. For preventing interference with the operation of liquid crystal molecules in TN mode, the overcoat layer 73, in which the EM sensor 300 is formed, is beneficially thick. It is also beneficial to form the light-shielding layer 71, the overcoat layer 73 of a material having a low dielectric constant, and the color filter layer 72 between the EM sensor 300 and the common electrode 74. Accordingly, in an LCD panel 500 according to the fifth embodiment of the present invention, the EM sensor 300 is formed on an inner surface of the upper substrate 51, whereby the EM sensor 300 is formed in one body with the upper substrate 51.

Hereinafter, an In-Plane switching mode LCD device, in which both pixel and common electrodes 63 and 67 are formed on a lower substrate 52, will be described as follows.

Figure 16:
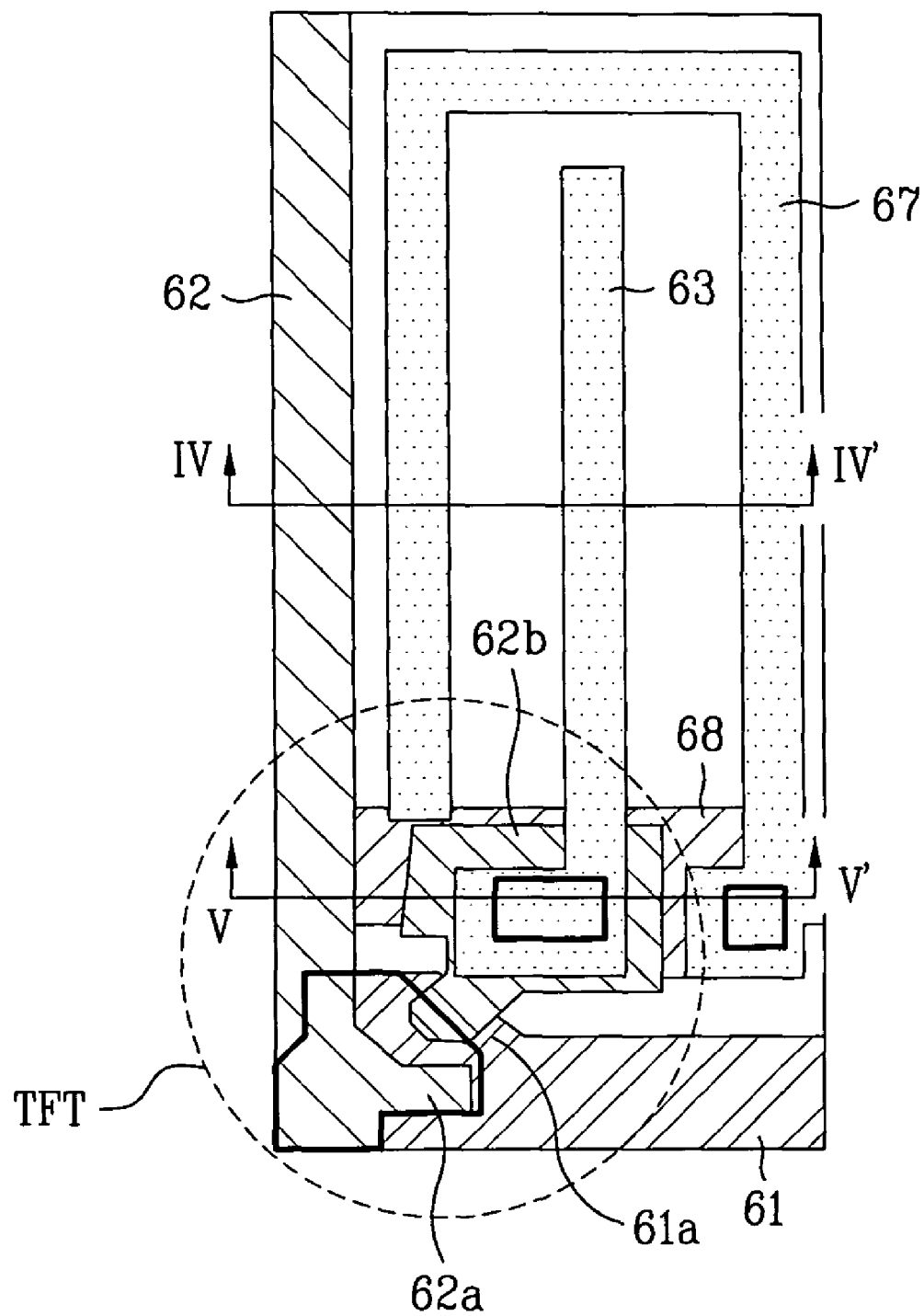
FIG. 16 is a plan view illustrating a lower substrate of an LCD device including an EM type touch panel according to the sixth and seventh embodiments of the present invention.
Figure 17:
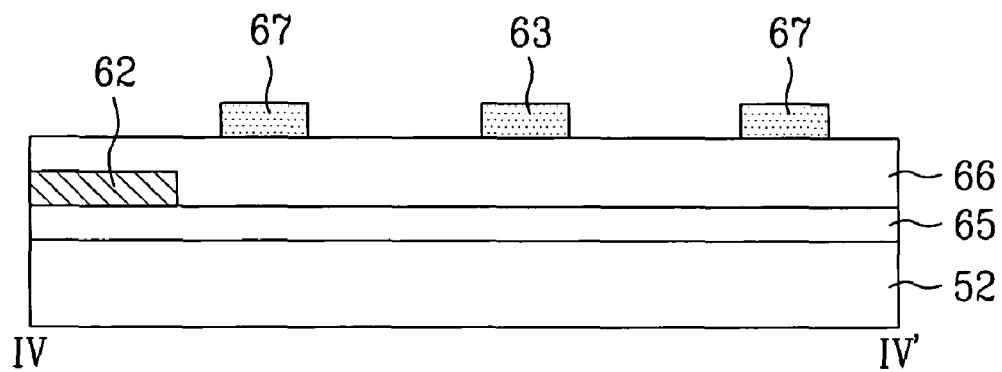
FIG. 17 is a cross-sectional view taken along line IV-IV' of FIG. 16.
Figure 18:
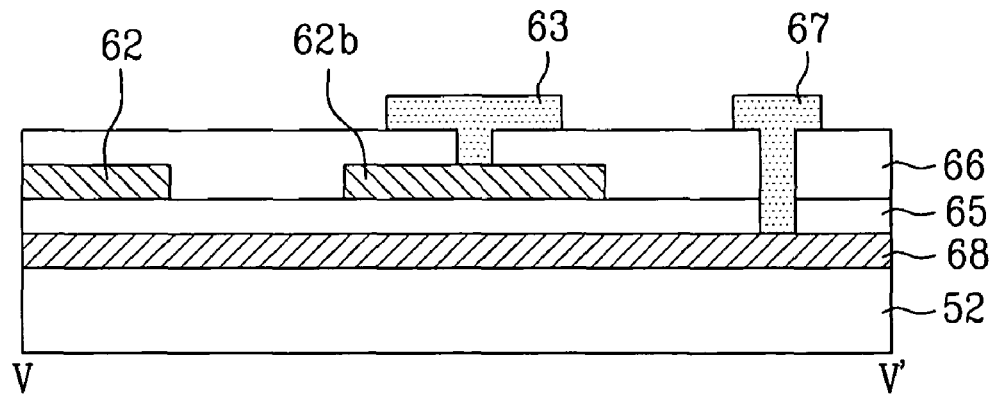
FIG. 18 is a cross-sectional view taken along line V-V' of FIG. 16.

FIG. 16 is a plan view illustrating a lower substrate of an LCD device including an EM type touch panel according to the sixth and seventh embodiments of the present invention. FIG. 17 is a cross-sectional view taken along line IV-IV' of FIG. 16. FIG. 18 is a cross-sectional view taken along line V-V' of FIG. 16.

As shown in FIG. 16, on the lower substrate (reference numeral 52 of FIG. 17 and FIG. 18) in the LCD device including the EM type touch panel according to the sixth and seventh embodiments of the present invention, a plurality of gate lines 61 are formed, and then a plurality of data lines 62 are formed in perpendicular to the gate lines 61, thereby defining a plurality of pixel regions. Then, a plurality of common lines 68 are formed at fixed intervals from the respective gate lines 61, and a plurality of thin film transistors TFT are formed at respective crossing points of the plurality of gate and data lines 61 and 62. Also, a pixel electrode 63 is formed in each pixel region for being connected to the drain electrode 62b of each thin film transistor TFT at a direction of the data line 62. Then, a common electrode 67 is formed in a shape of '∩' inside the pixel region for being connected to the common line 68 at a predetermined interval from the pixel electrode 63.

Briefly, a method for forming the lower substrate of the LCD device including the EM type touch panel according to the sixth and seventh embodiment of the present invention will be described with reference to FIG. 17 and FIG. 18.

First, a metal is deposited on an entire surface of the lower substrate 52, and then is selectively removed, whereby the gate line 61 having the projected gate electrode is formed horizontally, and the common line 68 is formed at the same direction as the gate line 61 to have a predetermined interval from the gate line 61. Subsequently, a gate insulating layer 65 is formed on the entire surface of the lower substrate 52 including the gate line 61 and the common line 68, and a semiconductor layer 64 is formed on the gate insulating layer 65 above the gate electrode 61a. Then, a metal is deposited on a predetermined portion of the gate insulating layer 65, and then is selectively removed, so that the data line 62 is formed in perpendicular to the gate line 61, and the source/drain electrodes 62a and 62b are formed. At this time, the thin film transistor TFT including the gate electrode 61a, the semiconductor layer 64 and the source/drain electrodes 62a and 62b is formed.

Next, a passivation layer 66 is formed on the entire surface of the lower substrate 52 including the data line 62. After that, contact holes are formed on the drain electrode 62b of the thin film transistor TFT and a predetermined portion of the common line 68. Then, a metal is deposited on an entire surface of the passivation layer 66, and a patterning process is performed thereto, so that the pixel electrode 63 is formed for being connected to the drain electrode 62b of the thin film transistor TFT, and the common electrode 67 is formed for being connected to the common line 68 at a predetermined interval from the pixel electrode 63. In this method, the common electrode 67 is in contact with the common line 68, for applying a voltage. Also, a data voltage is applied to the pixel electrode 63 according to TFT on/off operation. At this time, the plurality of common lines 68 are connected to one another in the external, whereby a common voltage Vcom signal is applied thereto.

Figure 19:
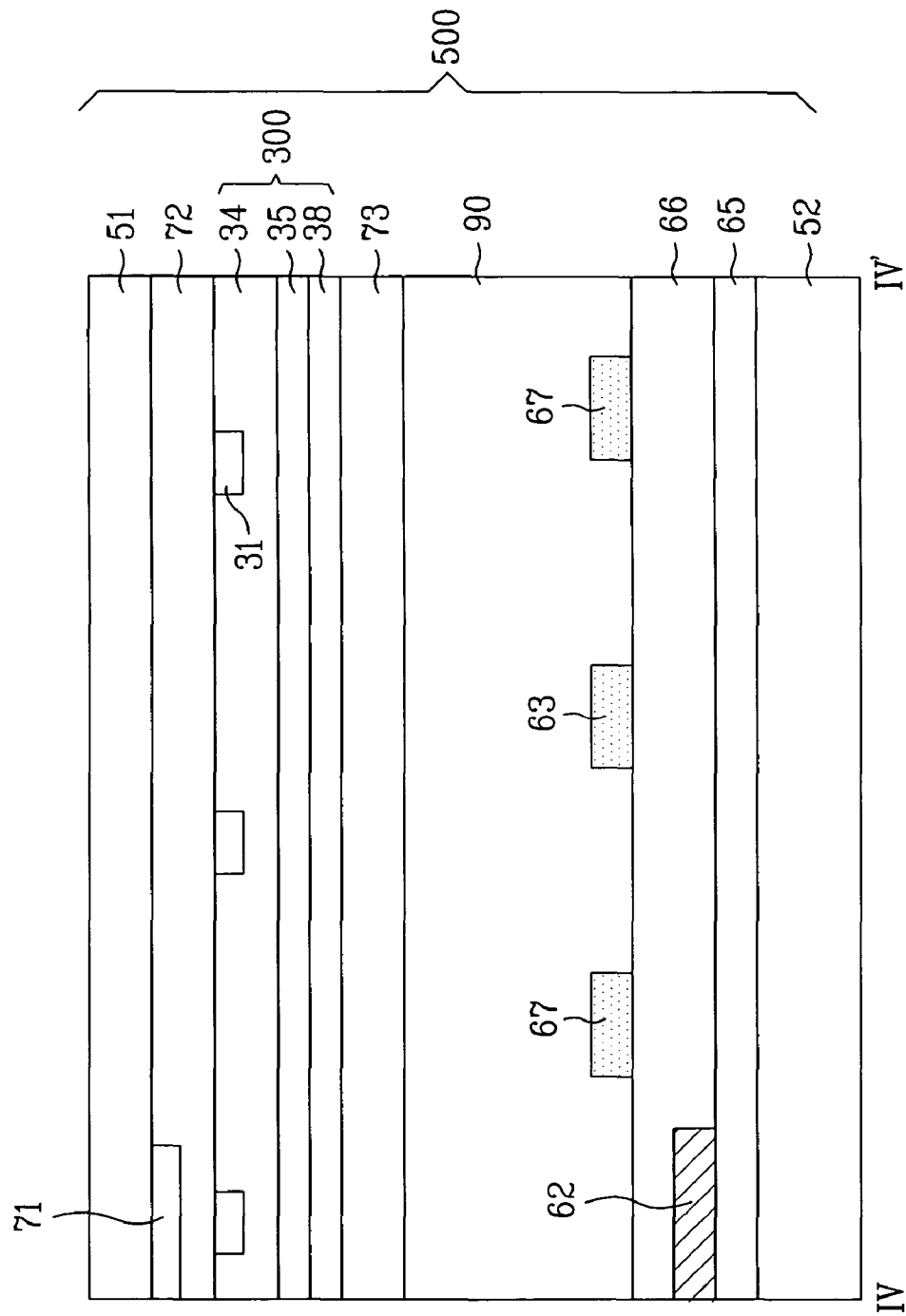
FIG. 19 is a cross-sectional view illustrating an LCD device including an EM type touch panel according to the sixth embodiment of the present invention.

FIG. 19 is a cross-sectional view illustrating the LCD device including the EM type touch panel according to the sixth embodiment of the present invention. As shown in FIG. 19, in the EM type touch panel according to the sixth embodiment of the present invention, structures are formed on the lower substrate 52 described in FIG. 16 to FIG. 18, and an upper substrate 51 will be explained as follows.

That is, a light-shielding layer 71 is formed on the upper substrate 51 corresponding to portions of the lower substrate 52 except the pixel regions, and a color filter layer 72 is formed on an entire surface of the upper substrate 51 to be overlapped with the light-shielding layer 71, corresponding to the pixel regions. Then, an EM sensor 300 having transparent electrode X-axis coils 31, a first transparent insulating layer 34, transparent electrode Y-axis coils 35 and a second transparent insulating layer 38 is formed on the color filter layer 72. Subsequently, an overcoat layer 73 is formed for flattening the surface of the EM sensor 300.

Next, a liquid crystal layer 90 is formed between the upper and lower substrates. For example, the overcoat layer 73 is formed of an organic insulating layer such as PhotoAcryl, BenzoCycloButen BCB or Polyamide compound, whereby the overcoat layer 73 has no effect on an In-Plane switching mode driving. In FIG. 19, the EM sensor 300 of FIG. 13 is positioned inversely, whereby the X-axis coils 31 meet the color filter layer 72. This structure is proposed in that the structure such as EM sensor 300 is formed on the upper substrate 70, sequentially. In fact, the X-axis coils 31 and the Y-axis coils 35 may be sequentially formed from the bottom inside the EM sensor 300, or may be formed inversely.

At this time, the first and second transparent insulating layers 34 and 38 are formed of an organic insulating layer to prevent a vertical cross-talk when applying a voltage to the common electrode 36 and the pixel electrode 37 on the lower substrate 300 for the In-Plane switching mode driving, thereby stabilizing an operation of the EM sensor 30. For example, the organic insulating layers are formed of PhotoAcryl, BenzoCycloButen BCB or Polyamide. Also, the X-axis and Y-axis coils 31 and 35 are formed of transparent electrodes such as oxide indium, oxide tin, oxide zinc, indium-tin-oxide, tin-antimony-oxide or indium-zinc-oxide.

Meanwhile, in the In-Plane switching mode LCD device, the pixel electrode 63 and the common electrode 67 are formed on the lower substrate 51, and the EM sensor 300 is formed on the upper substrate 52. In this state, the voltage is applied to each other, and the lower substrate 52 is controlled according to a self-driving circuit for applying the voltage, so that a predetermined distance generates exists between the upper and lower substrates, which corresponds to a cell gap. Also, a driving method is different in each substrate, whereby an In-Plane switching mode electric field of the lower substrate has no effect on a magnetic field on the upper substrate.

That is, the LCD device including the EM type touch panel according to the sixth embodiment of the present invention is different from a Twisted Nematic method in which the common electrode is formed on the entire surface of the upper substrate in that the LCD panel is driven by applying the voltage to the electrodes (pixel electrode and the common electrode) of the lower substrate 52. Accordingly, when an electronic stylus pen touches at a predetermined portion, the EM sensor 300 of the upper substrate 51 reads a voltage induced in a coil of a touched point and a resonant frequency, thereby detecting a location of the touched point. The LCD panel 500 according to the sixth embodiment of the present invention forms the EM sensor 300 on the upper substrate 51, so that the EM sensor 300 is formed in one body with the upper substrate 51.

Figure 20:
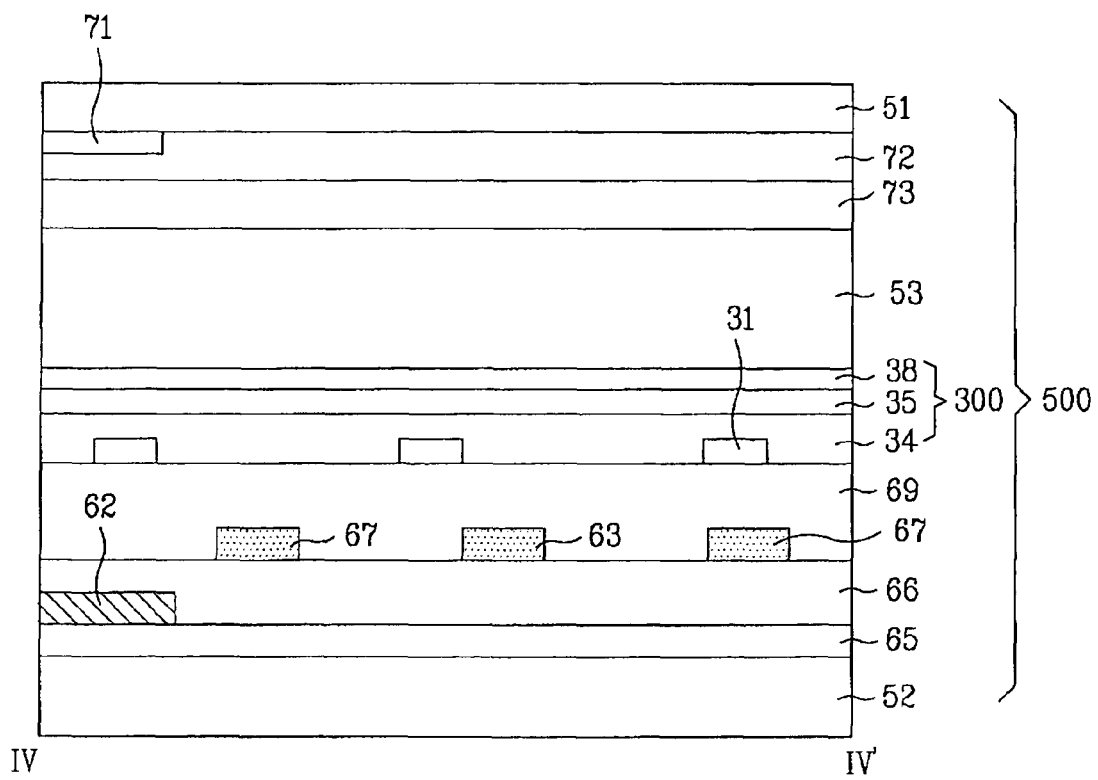
FIG. 20 is a cross-sectional view illustrating an LCD device including an EM type touch panel according to the seventh embodiment of the present invention.

FIG. 20 is a cross-sectional view illustrating the LCD device including the EM type touch panel according to the seventh embodiment of the present invention. As shown in FIG. 20, the LCD device including the EM type touch panel according to the seventh embodiment of the present invention has the same structure as the LCD device including the EM type touch panel according to the sixth embodiment of the present invention except that the EM sensor 300 is formed on the lower substrate 52.

In this structure, the EM sensor 300 is formed on the lower substrate 52 including the common electrode 67 and the pixel electrode 63. At this time, the EM sensor 300 may have effect on the In-Plane switching mode electric field generated between the common electrode 67 and the pixel electrode 63. In this respect, an insulating layer 69 having a predetermined thickness is formed on an uppermost surface of the lower substrate 52, a thin film transistor array substrate, to flat the lower substrate 52. For example, the insulating layer 69 is formed of an organic insulating layer such as PhotoAcryl, BenzoCycloButen BCB or Polyamide.

In the LCD panel 500 according to the sixth embodiment of the present invention, the EM sensor 300 is formed on the lower substrate 52, whereby the EM sensor 300 is formed in one body with the lower substrate 52. Also, as mentioned above, in the fifth to seventh embodiments of the present invention, when the EM sensor 300 is formed during the process of forming the LCD panel, in order to maintain transparency of the coils and the substrate having the coils, it is required to form an additional controller controlling the backlight formed below the LCD panel 500 for irradiating light, and to form the EM sensor 300 below the backlight unit. At this time, the controller 700 may be simultaneously formed with a board (not shown) having a driving circuit for driving the LCD panel, thereby improving integration of the LCD device.

As mentioned above, the LCD device including the EM type touch panel according to the present invention has the following advantages.

First, the coils are formed of the transparent electrodes, so that it is possible to form the EM type touch panel in one body with the polarizing plate without loss of transmittance.

Second, the voltage applying lines are positioned in the non-viewing area (dead space region) for applying the voltage to each coil on the EM type touch panel, thereby driving the EM type touch panel without loss of the viewing area.

Third, the EM type touch panel is not formed during the assembling process of the LCD panel and the backlight unit, but is formed during the manufacturing process of the LCD panel, thereby simplifying the manufacturing process and decreasing the thickness and the weight of the LCD device. Also, it is possible to improve the integration.

Fourth, when the EM sensor is formed during the formation of the LCD panel to maintain transparency of the coils and the substrate having the coils, it is possible to realize a more simplified manufacturing process in comparison with those methods where the EM sensor is formed on an additional board, and to have a great integration.

Fifth, the EM sensor is separately formed from the controller, which controls the EM sensor. That is, the EM sensor is formed inside the LCD panel, and the controller controlling the EM sensor is formed on the board having the driving circuit of the LCD panel, or the additional board, so that it is possible to realize a greater integration and a more simplified manufacturing process, as compared with those in the related art EM type touch panel, which forms the EM sensor and the controller in one body with the lower side of the LCD panel.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A LCD device including an electromagnetic (EM) type touch panel comprising:
   first and second substrates facing each other;
   a thin film transistor array on the first substrate;
   a plurality of pixel electrodes electrically connected to respective thin film transistors of the thin film transistor array;
   an EM sensor including first and second coil arrays formed of a transparent electrode on the second substrate, wherein each of the first and second coil arrays include a plurality of coils and each of the plurality of coils has first and second open ends and wherein the first coil array is perpendicular to the second coil array;
   a light-shielding layer and a color filter layer corresponding to the pixel electrodes are disposed on the EM sensor, wherein the light-shielding layer and the color filter layer are not coplanar with the EM sensor;
   an overcoat layer on the color filter layer and the light-shielding layer;
   a common electrode on the overcoat layer;
   a liquid crystal layer between the first and second substrates; and
   a backlight unit below the first substrate.

2. The LCD device of claim 1, further comprising a controller below the backlight unit for controlling the EM sensor.

3. The LCD device of claim 1, wherein the EM sensor includes:
   a first transparent insulating layer over the first coil array including the second substrate, wherein the first coil is formed on the second substrate; and
   a second transparent insulating layer over the first transparent insulating layer, including the second coil array, wherein the second coil array is formed on the first transparent insulating layer.

4. The LCD device of claim 3, wherein the first and second transparent insulating layers are formed of organic layers.

5. The LCD device of claim 1, wherein the first open end is electrically connected to a grounding voltage.

6. The LCD device of claim 5, wherein the second open end is electrically connected to a MUX.

7. The LCD device of claim 6 wherein one of the plurality of coils is selected, and then a voltage from the MUX is applied to the selected coil.

8. The LCD device of claim 1, wherein the overcoat layer is formed of an organic layer.

9. A LCD device including an EM type touch panel comprising:

first and second substrates facing each other;

a plurality of pixel regions on the first substrate, each pixel region including a thin film transistor, pixel electrode, and a common electrode;

a light-shielding layer and a color filter layer on the second substrate corresponding to the plurality of pixel regions;

an EM sensor including first and second coil arrays formed of a transparent electrode is disposed on the light-shielding layer and the color filter layer, wherein the first coil array is perpendicular to the second coil array and the light-shielding layer and the color filter layer are not coplanar with the EM sensor;

an overcoat layer on the EM sensor, wherein each of the first and second coil arrays include a plurality of coils, and each of the plurality of coils has first and second open ends;

a liquid crystal layer between the first and second substrates; and a backlight unit below the first substrate.

10. The LCD device of claim 9, further comprising a controller below the backlight unit for controlling the EM sensor.

11. The LCD device of claim 9, wherein the EM sensor includes:
a first transparent insulating layer over the light-shielding layer and the color filter layer including the first coil array, wherein the first coil array is formed on the light-shielding layer and the color filter; and
a second transparent insulating layer over the first transparent insulating layer including the second coil array, wherein the second coil array is formed on the first transparent insulating layer.

12. The LCD device of claim 11, wherein the first and second transparent insulating layers are formed of organic layers.

13. The LCD device of claim 9, wherein the first open end is electrically connected to a grounding voltage.

14. The LCD device of claim 13, wherein the second open end is electrically connected to a MUX.

15. The LCD device of claim 14, wherein one of the plurality of coils is selected, and then a voltage from the MUX is applied to the selected coil.

16. A LCD device including an EM type touch panel comprising:

first and second substrates facing each other;

a thin film transistor array on the first substrate;

a plurality of pixel electrodes electrically connected to respective thin film transistors of the thin film transistor array;

an insulating layer over the thin film transistor array and the pixel electrodes;

an EM sensor including first and second coil arrays formed of a transparent electrode is directly on the insulating layer, wherein each of the first and second coil arrays include a plurality of coils, and each of the plurality of coils has first and second open ends and wherein the first coil array is perpendicular to the second coil array;

a light-shielding layer and a color filter layer on the second substrates, wherein the light-shielding layer and the color filter layer are not coplanar with the EM sensor;

a liquid crystal layer between the first and second substrates; and a backlight unit below the first substrate.

17. The LCD device of claim 16, further comprising a common electrode on any one of the first and second substrates and a controller for controlling the EM sensor below the backlight unit.

18. The LCD device of claim 16, wherein the insulating layer is formed of an organic layer.

19. The LCD device of claim 16, wherein the EM sensor includes:
a first transparent insulating layer over the insulating layer including the first coil array, wherein the first coil array is formed on the insulating layer; and
a second transparent insulating layer over the first transparent insulating layer including the second coil array, wherein the second coil array is formed on the first transparent insulating layer.

20. The LCD device of claim 16, wherein the first open end is electrically connected to a grounding voltage.

21. The LCD device of claim 20, wherein the second open end is electrically connected to a MUX.

22. The LCD device of claim 21, wherein one of the coils is selected, and then a voltage from the MUX is applied to the selected coil.

* * * * *